US 11,597,856 B2

(12) United States Patent
Franke et al.

(10) Patent No.: US 11,597,856 B2
(45) Date of Patent: Mar. 7, 2023

(54) CONTINUOUS ADDITIVE MANUFACTURING METHODS

(71) Applicant: 3M INNOVATIVE PROPERTIES COMPANY, St. Paul, MN (US)

(72) Inventors: Carsten Franke, St. Paul, MN (US); Kenneth L. Smith, White Bear Lake, MN (US); Jesse R. Behnke, Maplewood, MN (US); Robert L. W. Smithson, Mahtomedi, MN (US); Lucas D. Crestik, Roseville, MN (US); Olester Benson, Jr., Woodbury, MN (US); Alexander J. Huffman, St. Paul, MN (US); Michael A. Kropp, Cottage Grove, MN (US); John P. Baetzold, North St. Paul, MN (US); Serkan Yurt, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 901 days.

(21) Appl. No.: 16/066,360

(22) PCT Filed: Dec. 13, 2016

(86) PCT No.: PCT/US2016/066275
§ 371 (c)(1),
(2) Date: Jun. 27, 2018

(87) PCT Pub. No.: WO2017/116678
PCT Pub. Date: Jul. 6, 2017

(65) Prior Publication Data
US 2018/0355221 A1 Dec. 13, 2018

Related U.S. Application Data

(60) Provisional application No. 62/272,463, filed on Dec. 29, 2015.

(51) Int. Cl.
*B29C 64/00* (2017.01)
*C09J 7/38* (2018.01)
(Continued)

(52) U.S. Cl.
CPC .............. *C09J 7/385* (2018.01); *B05D 3/067* (2013.01); *B05D 5/10* (2013.01); *B23K 26/082* (2015.10);
(Continued)

(58) Field of Classification Search
CPC . C09J 7/385; C09J 7/20; C09J 2201/40; C09J 2205/31; C09J 2433/00;
(Continued)

(56) References Cited

U.S. PATENT DOCUMENTS 2,797,201 A 6/1957 Veatch
3,365,315 A 1/1968 Beck
(Continued)

FOREIGN PATENT DOCUMENTS

EP 1473594 11/2004
EP 1886800 2/2008
(Continued)

OTHER PUBLICATIONS

International Search report for PCT International Applications No. PCT/US2016/066275 dated Mar. 27, 2017, 3 pages.

*Primary Examiner* — Brian K Talbot
(74) *Attorney, Agent, or Firm* — Adrian L. Pishko

(57) ABSTRACT

A continuous method of manufacturing adhesives is provided. The method includes obtaining an actinic radiation-polymerizable adhesive precursor composition disposed on a major surface of an actinic radiation-transparent substrate and irradiating a first portion of the actinic radiation-polymerizable adhesive precursor composition through the actinic radiation-transparent substrate for a first irradiation dosage.

(Continued)

The method further includes moving the actinic radiation-transparent substrate and irradiating a second portion of the actinic radiation-polymerizable adhesive precursor composition through the actinic radiation-transparent substrate for a second irradiation dosage. Optionally, the method also includes irradiating a third portion of the actinic radiation-polymerizable adhesive precursor composition through the actinic radiation-transparent substrate prior to moving the substrate. The first irradiation dosage and the third irradiation dosage are often not the same, thereby forming an integral adhesive having a variable thickness in an axis normal to the actinic radiation-transparent substrate.

19 Claims, 10 Drawing Sheets

(51) Int. Cl.

| | | |
|---|---|---|
| *C09J 7/20* | (2018.01) | |
| *B05D 3/06* | (2006.01) | |
| *B33Y 70/00* | (2020.01) | |
| *B23K 26/082* | (2014.01) | |
| *B29C 64/245* | (2017.01) | |
| *B29C 64/129* | (2017.01) | |
| *B05D 5/10* | (2006.01) | |
| *B05D 1/28* | (2006.01) | |
| *B33Y 10/00* | (2015.01) | |
| *B33Y 30/00* | (2015.01) | |
| *B33Y 80/00* | (2015.01) | |

(52) U.S. Cl.
CPC ............ *B29C 64/00* (2017.08); *B29C 64/129* (2017.08); *B29C 64/245* (2017.08); *B33Y 70/00* (2014.12); *C09J 7/20* (2018.01); *B05D 1/286* (2013.01); *B05D 2252/02* (2013.01); *B33Y 10/00* (2014.12); *B33Y 30/00* (2014.12); *B33Y 80/00* (2014.12); *C09J 2301/21* (2020.08); *C09J 2301/416* (2020.08); *C09J 2433/00* (2013.01); *C09J 2463/00* (2013.01); *C09J 2475/00* (2013.01)

(58) Field of Classification Search
CPC ... C09J 2463/00; C09J 2475/00; B05D 1/286; B05D 1/32; B05D 3/067; B05D 5/10; B29C 64/00; B29C 64/245; B29C 64/129
USPC .......................... 264/401; 427/553, 558, 559
See application file for complete search history.

(56) References Cited

U.S. PATENT DOCUMENTS

| | | | | |
|---|---|---|---|---|
| 4,329,384 | A | 5/1982 | Vesley | |
| 4,330,590 | A | 5/1982 | Vesley | |
| 4,950,696 | A | 8/1990 | Palazotto | |
| 5,468,542 | A * | 11/1995 | Crouch | B05D 3/0263 427/495 |
| 5,531,855 | A | 7/1996 | Heinecke | |
| 5,658,063 | A | 8/1997 | Nasserbakht | |
| 5,766,277 | A * | 6/1998 | DeVoe | B24D 3/28 51/295 |
| 5,905,545 | A | 5/1999 | Poradish | |
| 6,436,532 | B1 * | 8/2002 | Moon | C08F 2/48 428/355 AC |
| 6,455,152 | B1 * | 9/2002 | DiZio | B05C 1/0813 428/345 |
| 6,472,025 | B1 * | 10/2002 | Guldbrandsen | B05D 1/286 427/487 |
| 6,587,159 | B1 | 7/2003 | Dewald | |
| 6,939,588 | B2 * | 9/2005 | Husemann | C09J 7/20 427/551 |
| 7,164,397 | B2 | 1/2007 | Pettitt | |
| 7,360,905 | B2 | 4/2008 | Davis | |
| 8,705,133 | B2 | 4/2014 | Lieb | |
| 8,820,944 | B2 | 9/2014 | Vasquez | |
| 2001/0026907 | A1 | 10/2001 | Husemann | |
| 2003/0236362 | A1 | 12/2003 | Bluem | |
| 2007/0031791 | A1 | 2/2007 | Cinader, Jr. | |
| 2010/0139707 | A1 * | 6/2010 | Boonstra | B32B 27/08 134/29 |
| 2010/0178431 | A1 | 7/2010 | Neuhaus-Steinmetz | |
| 2012/0034447 | A1 * | 2/2012 | Higuchi | C09J 5/00 428/317.3 |
| 2012/0181703 | A1 | 7/2012 | Park | |
| 2013/0029147 | A1 * | 1/2013 | Miki | C09J 7/38 428/355 CN |
| 2013/0064987 | A1 | 3/2013 | Fukunaga | |
| 2015/0151528 | A1 * | 6/2015 | Shimizu | B32B 7/12 428/408 |
| 2016/0342003 | A1 * | 11/2016 | Takeda | C09K 19/2014 |
| 2017/0291360 | A1 | 10/2017 | Franke | |
| 2018/0215133 | A1 * | 8/2018 | Jang | B29C 66/81 |

FOREIGN PATENT DOCUMENTS

| | | |
|---|---|---|
| EP | 2343730 | 7/2011 |
| EP | 2366751 | 9/2011 |
| EP | 2568025 | 3/2013 |
| JP | 2004-300333 | 10/2004 |
| JP | 2010-077317 | 4/2010 |
| JP | 2010-526899 | 8/2010 |
| JP | 2013-059708 | 4/2013 |
| JP | 2013-186140 | 9/2013 |
| JP | 2014-056040 | 3/2014 |
| JP | 2014-237779 | 12/2014 |
| JP | H06-504809 | 4/2019 |
| KR | 101190855 | 10/2012 |
| WO | WO 92/15394 | 9/1992 |
| WO | WO 1996-14215 | 5/1996 |
| WO | WO 1998-12021 | 3/1998 |
| WO | WO 2012-166460 | 12/2012 |
| WO | WO 2014-186265 | 11/2014 |
| WO | WO 2017-116679 | 6/2017 |
| WO | WO 2017-117035 | 6/2017 |

* cited by examiner

CONTINUOUS ADDITIVE MANUFACTURING METHODS

CROSS REFERENCE TO RELATED APPLICATIONS

This application is a national stage filing under 35 U.S.C. 371 of PCT/US2016/066275, filed Dec. 13, 2016, which claims the benefit of U.S. Application No. 62/272,463, filed Dec. 29, 2015, the disclosure of which is incorporated by reference in its/their entirety herein.

TECHNICAL FIELD

The present disclosure relates to continuous methods for additive manufacturing of adhesives.

BACKGROUND

In various industries, components of devices are joined together using an adhesive, such as a pressure sensitive adhesive, a hot melt adhesive, or a structural adhesive. As devices are miniaturized, the need for higher precision delivery of adhesives increases. Moreover, there are certain shapes of adhesives that cannot be prepared by die-cutting of an adhesive, for instance a wedge shape.

SUMMARY

The present disclosure relates to additive manufacturing of adhesives. It has been discovered that there exists a need for additional methods for manufacturing adhesives, such as continuous methods.

In a first aspect, a continuous method of making an adhesive is provided. The method includes obtaining an actinic radiation-polymerizable adhesive precursor composition disposed on a major surface of an actinic radiation-transparent substrate and irradiating a first portion of the actinic radiation-polymerizable adhesive precursor composition through the actinic radiation-transparent substrate for a first irradiation dosage to form a first adhesive. The method further includes moving the actinic radiation-transparent substrate and irradiating a second portion of the actinic radiation-polymerizable adhesive precursor composition through the actinic radiation-transparent substrate for a second irradiation dosage to form a second adhesive.

In a second aspect, another continuous method of making an adhesive is provided. The method includes obtaining an actinic radiation-polymerizable adhesive precursor composition disposed on a major surface of an actinic radiation-transparent substrate and irradiating a first portion of the actinic radiation-polymerizable adhesive precursor composition through the actinic radiation-transparent substrate for a first irradiation dosage. The method further includes irradiating a second portion of the actinic radiation-polymerizable adhesive precursor composition through the actinic radiation-transparent substrate for a second irradiation dosage and moving the actinic radiation-transparent substrate. The first portion and the second portion are adjacent to or overlapping with each other and the first irradiation dosage and the second irradiation dosage are not the same, thereby forming an integral adhesive having a variable thickness in an axis normal to the actinic radiation-transparent substrate.

The above summary of the present disclosure is not intended to describe each disclosed aspect or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Figure 1:
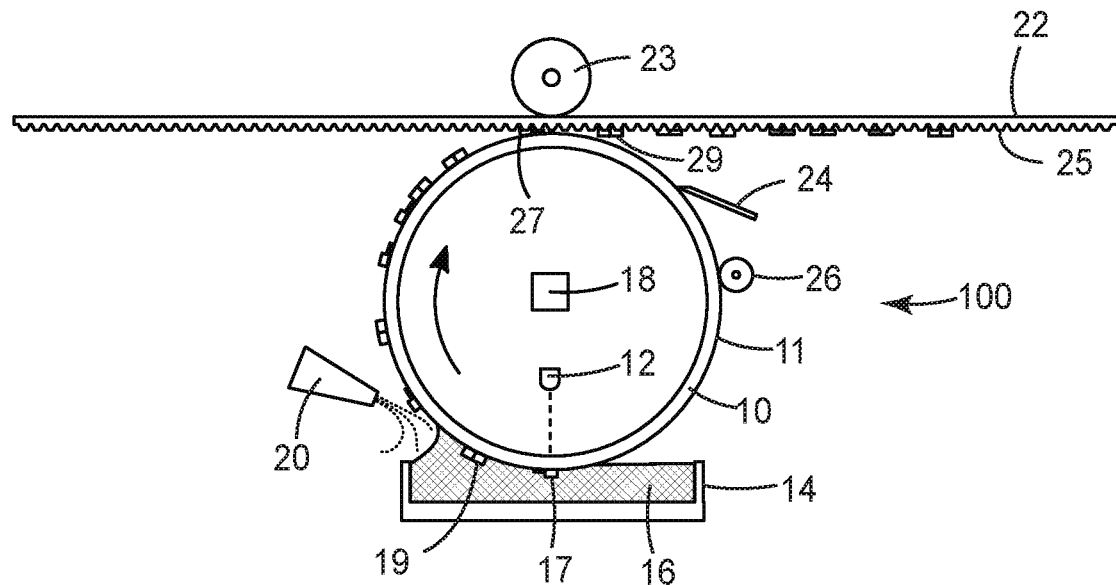
FIG. 1 is a schematic cross-sectional view of an apparatus for use in an exemplary method according to the present disclosure.

The present disclosure provides methods for the additive manufacturing of adhesives, such as continuous manufacturing of the adhesives. In certain embodiments, integral adhesives having variations in thickness are formed, while in other embodiments a plurality of adhesives having approximately the same thickness are formed.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

As used in this specification and the appended embodiments, the singular forms "a", "an", and "the" include plural referents unless the content clearly dictates otherwise. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The term "actinic radiation" refers to electromagnetic radiation that can produce photochemical reactions.

The term "dosage" means a level of exposure to of actinic radiation.

The term "integral" means composed of parts that together constitute a whole.

The term "(co)polymer" is inclusive of both homopolymers containing a single monomer and copolymers containing two or more different monomers.

The term "(meth)acrylic" or "(meth)acrylate" is inclusive of both acrylic and methacrylic (or acrylate and methacrylate). Acrylate and methacrylate monomers, oligomers, or polymers are referred to collectively herein as "acrylates".

The term "aliphatic group" means a saturated or unsaturated linear or branched hydrocarbon group. This term is used to encompass alkyl, alkenyl, and alkynyl groups, for example.

The term "alkyl group" means a saturated hydrocarbon group that is linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl group include without limitation, methyl, ethyl, isopropyl, t-butyl, heptyl, dodecyl, octadecyl, amyl, 2-ethylhexyl, and the like. The term "alkylene group" refers to a divalent alkyl group.

The term "alicyclic group" means a cyclic hydrocarbon group having properties resembling those of aliphatic groups. The term "aromatic group" or "aryl group" means a mono- or polynuclear aromatic hydrocarbon group.

The term "pattern" with respect to an adhesive refers to a design of an adhesive that defines at least one aperture in the adhesive.

The term "solvent" refers to a substance that dissolves another substance to form a solution.

The term "total monomer" refers to the combination of all monomers in an adhesive composition, including both in a polymerized reaction product and in optional additional materials.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in some embodiments," "in certain embodiments," "in one embodiment," "in many embodiments" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

Various exemplary embodiments of the disclosure will now be described. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

In a first aspect, a continuous method is provided. The method includes obtaining an actinic radiation-polymerizable adhesive precursor composition disposed on a major surface of an actinic radiation-transparent substrate and irradiating a first portion of the actinic radiation-polymerizable adhesive precursor composition through the actinic radiation-transparent substrate for a first irradiation dosage to form a first adhesive. The method further includes moving the actinic radiation-transparent substrate and irradiating a second portion of the actinic radiation-polymerizable adhesive precursor composition through the actinic radiation-transparent substrate for a second irradiation dosage to form a second adhesive.

In a second aspect, another continuous method of making an adhesive is provided. The method includes obtaining an actinic radiation-polymerizable adhesive precursor composition disposed on a major surface of an actinic radiation-transparent substrate and irradiating a first portion of the actinic radiation-polymerizable adhesive precursor composition through the actinic radiation-transparent substrate for a first irradiation dosage. The method further includes irradiating a second portion of the actinic radiation-polymerizable adhesive precursor composition through the actinic radiation-transparent substrate for a second irradiation dosage and moving the actinic radiation-transparent substrate. The first portion and the second portion are adjacent to or overlapping with each other and the first irradiation dosage and the second irradiation dosage are not the same, thereby forming an integral adhesive having a variable thickness in an axis normal to the actinic radiation-transparent substrate.

The below disclosure relates to both the first and second aspects.

Such continuous methods are adaptable for manufacturing a variety of adhesive structures. For instance, a continuous method can form a series or array of individual adhesives each separated from each other by approximately the distance the substrate was moved in between irradiation of the separate adhesives. The individual adhesives in some embodiments have the same dimensions of height, length, and width as each other. In contrast, the individual adhesives in other embodiments differ from each other in at least one of height (i.e., z-direction from a major surface of the substrate), length, and width. Advantageously, the methods of the present disclosure provide the capability to easily manufacture individual adhesives having a number of unique shapes due to employing adaptable actinic radiation sources, from which the bounds and dosage of the actinic radiation determine the specific shape of an individual adhesive. For instance, digital light projectors, laser scanning devices, and liquid crystal displays can all be controlled to change the area and intensity of the actinic radiation that causes curing of the actinic radiation-polymerizable adhesive precursor composition.

As noted above, die-cutting of an adhesive is not readily capable of forming adhesives having a wedge shape. Similarly, die-cutting is not amenable to forming an adhesive that has a height gradient or other unique shapes. The (continuous) methods of the present disclosure not only provide a wide variety of shapes and gradients, but also can manufacture multiple different shapes and heights on the same substrate.

Hence, in certain embodiments, methods of the first aspect further comprise irradiating a third portion of the actinic radiation-polymerizable adhesive precursor composition through the actinic radiation-transparent substrate prior to moving the substrate, wherein the first portion and the third portion are adjacent to or overlapping with each other. When the first irradiation dosage and the third irradiation dosage are not the same, an integral adhesive is formed comprising a variable thickness in an axis normal to the actinic radiation-transparent substrate. In certain embodiments, the time of irradiation of the first dosage is shorter or longer than the time of irradiation of the third dosage. In certain embodiments, the actinic radiation intensity of the first dosage is lower or higher than the actinic radiation intensity of the third dosage. In certain embodiments, irradiating the first portion occurs before irradiating the third portion, at the same time as irradiating the third portion, or a combination thereof.

Optionally, methods of the first aspect further comprise irradiating a fourth portion of the actinic radiation-polymerizable adhesive precursor composition through the actinic radiation-transparent substrate. When the second portion and the fourth portion are adjacent to or overlapping with each other and the second irradiation dosage and the fourth irradiation dosage are not the same, a second integral adhesive comprising a variable thickness in an axis normal to the major surface of the actinic radiation-transparent substrate. In certain embodiments, the time of irradiation of the second dosage is shorter or longer than the time of irradiation of the fourth dosage. In certain embodiments, the actinic radiation intensity of the second dosage is lower or higher than the actinic radiation intensity of the fourth dosage. In certain embodiments, irradiating the second portion occurs before irradiating the fourth portion, at the same time as irradiating the fourth portion, or a combination thereof.

Alternatively, in certain embodiments the method comprises applying the same irradiation dosage to a number of different portions of the actinic radiation-polymerizable adhesive precursor composition (e.g., to both the first portion and the third portion), thereby forming a pattern of adhesive having the same thickness in an axis normal to the major surface of the actinic radiation-transparent substrate. The pattern includes one or more individual adhesives that can be either integral or separate from one or more other individual adhesives of the same height.

In certain embodiments, methods of the second aspect further comprise irradiating a third portion of the actinic radiation-polymerizable adhesive precursor composition through the actinic radiation-transparent substrate for a third irradiation dosage, after moving the substrate. Optionally, the first irradiation dosage and the third irradiation dosage are the same or different. Moreover, methods of the second aspect may further comprise irradiating a fourth portion of the actinic radiation-polymerizable adhesive precursor composition through the actinic radiation-transparent substrate for a fourth irradiation dosage. The third portion and the fourth portion are adjacent to or overlapping with each other and the third irradiation dosage and the fourth irradiation dosage are not the same, thereby forming an integral adhesive. In such embodiments, the actinic radiation-transparent substrate is moved after irradiating the fourth portion of the actinic radiation-polymerizable adhesive precursor composition through the actinic radiation-transparent substrate.

In most embodiments, the (e.g., integral) adhesive is a pressure sensitive adhesive (PSA), a structural adhesive, a structural hybrid adhesive, a hot melt adhesive, or a combination thereof. For example, the adhesive is often prepared from an actinic radiation-polymerizable adhesive precursor composition comprising an acrylate, a two-part acrylate and epoxy system, a two-part acrylate and urethane system, or a combination thereof. In certain embodiments, the actinic radiation-polymerizable adhesive precursor composition is a 100% polymerizable precursor composition, while in other embodiments the actinic radiation-polymerizable adhesive precursor composition comprises at least one solvent, such as for instance and without limitation C4-C12 alkanes (e.g., heptanes), alcohols (e.g., methanol, ethanol, or isopropanol), ethers, and esters.

The acrylic polymer can be, for example, an acrylic acid ester of a non-tertiary alcohol having from 1 to 18 carbon atoms. In some embodiments, the acrylic acid ester includes a carbon-to-carbon chain having 4 to 12 carbon atoms and terminates at the hydroxyl oxygen atom, the chain containing at least half of the total number of carbon atoms in the molecule.

Certain useful acrylic acid esters are polymerizable to a tacky, stretchable, and elastic adhesive. Examples of acrylic acid esters of nontertiary alcohols include but are not limited to 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Suitable acrylic acid esters of nontertiary alcohols include, for example, 2-ethylhexyl acrylate and isooctylacrylate.

To enhance the strength of the adhesive, the acrylic acid ester may be copolymerized with one or more monoethylenically unsaturated monomers that have highly polar groups. Such monoethylenically unsaturated monomer such as acrylic acid, methacrylic acid, itaconic acid, acrylamide, methacrylamide, N-substituted acrylamides (for example, N,N-dimethyl acrylamide), acrylonitrile, methacrylonitrile, hydroxyalkyl acrylates, cyanoethyl acrylate, N-vinylpyrrolidone, N-vinylcaprolactam, and maleic anhydride. In some embodiments, these copolymerizable monomers are used in amounts of less than 20% by weight of the adhesive matrix such that the adhesive is tacky at ordinary room temperatures. In some cases, tackiness can be preserved at up to 50% by weight of N-vinylpyrrolidone.

Especially useful are acrylate copolymers comprising at least 6% by weight acrylic acid, and in other embodiments, at least 8% by weight, or at least 10% by weight acrylic acid, each based on the total weight of the monomers in the acrylate copolymer. The adhesive may also include small amounts of other useful copolymerizable monoethylenically unsaturated monomers such as alkyl vinyl ethers, vinylidene chloride, styrene, and vinyltoluene.

In certain embodiments, adhesives according to the present disclosure comprise two-part acrylate and epoxy systems. For instance, suitable acrylate-epoxy compositions are described in detail in U.S. Application Publication No. 2003/0236362 (Bluem et al.) In certain embodiments, adhesives according to the present disclosure comprise two-part acrylate and urethane systems. For instance, suitable acrylate-urethane compositions are described in detail in U.S. Pat. No. 4,950,696 (Palazotto et al.)

Enhancement of the cohesive strength of the adhesive may also be achieved through the use of a crosslinking agent such as 1,6-hexanediol diacrylate, with a photoactive triazine crosslinking agent such as taught in U.S. Pat. No. 4,330,590 (Vesley) and U.S. Pat. No. 4,329,384 (Vesley et al.), or with a heat-activatable crosslinking agent such as a lower-alkoxylated amino formaldehyde condensate having C1-4 alkyl groups—for example, hexamethoxymethyl melamine or tetramethoxymethyl urea or tetrabutoxymethyl urea. Crosslinking may be achieved by irradiating the composition with electron beam (or "e-beam") radiation, gamma radiation, or x-ray radiation. Bisamide crosslinkers may be used with acrylic adhesives in solution.

In a typical photopolymerization method, a monomer mixture may be irradiated with actinic radiation, such as for example ultraviolet (UV) rays, in the presence of a photopolymerization initiator (i.e., photoinitiators). Suitable exemplary photoinitiators are those available under the trade designations IRGACURE and DAROCUR from BASF (Ludwigshafen, Germany) and include 1-hydroxycyclohexyl phenyl ketone (IRGACURE 184), 2,2-dimethoxy-1, 2-diphenylethan-1-one (IRGACURE 651), bis(2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenylbutanone (IRGACURE 369), 2-methyl-1-[4-(methylthio)phenyl]-2-morpholinopropan-1-one (IRGACURE 907), Oligo[2-hydroxy-2-methyl-1-[4-(1-methylvinyl)phenyl]propanone] ESACURE ONE (Lamberti S.p.A., Gallarate, Italy), 2-hydroxy-2-methyl-1-phenyl propan-1-one (DAROCUR 1173), 2,4,6-trimethylbenzoyldiphenylphosphine oxide (IRGACURE TPO), and 2,4,6-trimethylbenzoylphenyl phosphinate (IRGACURE TPO-L). Additional suitable photoinitiators include for example and without limitation, benzyl dimethyl ketal, 2-methyl-2-hydroxypropiophenone, benzoin methyl ether, benzoin isopropyl ether, anisoin methyl ether, aromatic sulfonyl chlorides, photoactive oximes, and combinations thereof. When used, a photoinitiator is typically present in an amount between about 0.01 to about 5.0 parts, or from 0.1 to 1.5 parts, per 100 parts by weight of total monomer.

In many embodiments, the method comprises post-curing the one or more formed adhesives (e.g., the first adhesive, the second adhesive, the integral adhesive, etc.), for instance post-curing using actinic radiation or heat. In such embodiments, by not requiring an adhesive to be cured to the full extent needed for a particular application during an initial irradiation, radiation variables can be focused on polymerizing to form a desired shape and size.

The post-cure of the adhesive is optionally initiated using a thermal initiator. Suitable thermal initiators include for example and without limitation, 2,2'-azobis(2,4-dimethylvaleronitrile), 2,2'-azobisisobutyronitrile (VAZO 64, available from E.I. du Pont de Nemours Co.), 2,2'-azobis(2,4-dimethylpentanenitrile) (VAZO 52, available from E.I. du Pont de Nemours Co.), 2,2'-azobis-2-methylbutyronitrile, (1,1'-azobis(1-cyclohexanecarbonitrile), 2,2'-azobis(methyl isobutyrate), 2,2'-azobis(2-amidinopropane) dihydrochloride, 2,2'-azobis(4-methoxy-2,4-dimethylvaleronitrile), 4,4'-azobis(4-cyanopentanoic acid) and its soluble salts (e.g., sodium, potassium)benzoyl peroxide, acetyl peroxide, lauroyl peroxide, decanoyl peroxide, dicetyl peroxydicarbonate, di(4-t-butylcyclohexyl) peroxydicarbonate, di(2-ethylhexyl) peroxydicarbonate, t-butylperoxypivalate, t-butylperoxy-2-ethylhexanoate, dicumyl peroxide, potassium persulfate, sodium persulfate, ammonium persulfate, combinations of the persulfates with sodium metabisulfite or sodium bisulfite, benzoyl peroxide plus dimethylaniline, cumene hydroperoxide plus cobalt naphthenate, and combinations thereof. When used, a thermal initiator is typically present in an amount from about 0.01 to about 5.0 parts, or from 0.1 to 0.5 parts, per 100 parts by weight of total monomer.

The method often further comprises removing actinic radiation-polymerizable adhesive precursor composition remaining in contact with the adhesives (e.g., the first adhesive, the second adhesive, the integral adhesive, etc.). Removing precursor composition that has not been polymerized after the irradiating may involve the use of gravity, a gas, a vacuum, a fluid, or any combination thereof. Optionally, a suitable fluid for removing excess adhesive precursor composition includes a solvent. When the adhesive will be post-cured, it may be particularly desirable to remove residual precursor composition from being in contact with the adhesive, to minimize or prevent the addition of adhesive material to the desired shape and size of the adhesive upon post-curing.

The temperature(s) at which methods according to the present disclosure are performed is not particularly limited. For methods employing an actinic radiation-polymerizable adhesive precursor composition that is in a liquid form at room temperature (e.g., 20-25 degrees Celsius), for simplicity at least some of the various steps of the method are typically performed at room temperature. For methods employing an actinic radiation-polymerizable adhesive precursor composition that is in a solid form at room temperature, at least some of the various steps of the method may be performed at an elevated temperature above room temperature such that the actinic radiation-polymerizable adhesive precursor composition is in a liquid form. Elevated temperatures may be used through an entire method, or through such steps as formation of an adhesive, removal of unpolymerized actinic radiation-polymerizable adhesive precursor composition, and/or optional post-curing of the adhesive. In some embodiments, certain portions of the method are performed at different temperatures, whereas in some other embodiments, the entire method is performed at one temperature. Suitable elevated temperatures include for instance and without limitation, above 25 degrees Celsius and up to 150 degrees Celsius, up to 130 degrees Celsius, up to 110 degrees Celsius, up to 100 degrees Celsius, up to 90 degrees Celsius, up to 80 degrees Celsius, up to 70 degrees Celsius, up to 60 degrees Celsius, up to 50 degrees Celsius, or up to 40 degrees Celsius. In certain embodiments, the method is performed at a temperature between 20 degrees Celsius and 150 degrees Celsius, inclusive; between 30 degrees Celsius and 150 degrees Celsius, inclusive; between 25 degrees Celsius and 100 degrees Celsius, inclusive; or between 25 degrees Celsius and 70 degrees Celsius, inclusive. The temperature employed is typically limited only by the lowest maximum temperature at which a material used in the method (e.g., a substrate, an apparatus component, etc.) remains thermally stable.

In certain embodiments, the method is performed on an apparatus that is separate from other materials used in an end application for the one or more formed adhesives. In such embodiments, the method further comprises removing the first integral adhesive from the substrate, as discussed in further detail below.

The resulting adhesive is an adhesive due to its ability to adhere two materials together. Characteristics such as specific peel force, tackiness, etc., are not particularly limited as long as the formed adhesive adheres two material together (e.g., two layers in a multilayer construction, two components of a device, and the like). Typically, such a test involves disposing the formed adhesive between two substrates (one or both may be polymeric, glass, ceramic, or metal), lifting the article by the edges of one of the substrates, and observing whether or not the second substrate remains attached to the article.

In certain embodiments, the adhesive comprises variations in index of refraction. Such variations are typically formed as artifacts of the irradiation of the actinic radiation-polymerizable adhesive precursor composition with the various irradiation sources. For instance, for an integral adhesive having variability in its thickness, often there will be a variation in the index of refraction between the portions of the integral adhesive that were subjected to different dosages to form the variability in the thickness.

Referring to FIG. 1, a schematic of an apparatus 100 for use in exemplary methods of the present disclosure is provided. The apparatus includes an actinic radiation-transparent substrate 10 having a major surface 11 and an irradiation source 12 configured to direct actinic radiation through the actinic radiation-transparent substrate 10 at predetermined dosages at predetermined locations. The apparatus 100 further includes a means for depositing 14 a composition 16 onto the major surface 11 of the actinic radiation-transparent substrate 10 and a means for conveying 18 the actinic radiation-transparent substrate 10 or the irradiation source 12 with respect to each other. In the apparatus illustrated in FIG. 1, the means for depositing 14 a composition 16 onto the major surface 11 of the actinic radiation-transparent substrate 10 comprises an open container holding a volume of the composition 16 positioned adjacent to the substrate 10 such that a portion of the major surface 11 of the substrate 10 is in contact with the composition 16. The contact deposits the composition 16 on the major surface 11 of the substrate 10, then as the means for conveying 18 the substrate 10 rotates, the composition 16 continues to be deposited on the portions of the major surface 11 of the substrate 10 that come into contact with the composition 16 held in the container 14.

In certain embodiments, the apparatus 100 further comprises an air knife 20 configured to remove a composition from the substrate. Air knives are well known in the art and use compressed air to blow off contaminants, excess materials, etc. from a product or apparatus.

The apparatus optionally further comprises a second substrate 22. The substrate is not particularly limited in material or surface structure; for example the second substrate 22 illustrated in FIG. 1 comprises a structured sheet, in which at least one major surface 25 of the sheet is structured (as opposed to flat and featureless). Suitable sheet materials include for instance and without limitation, polymeric materials selected from polyethylene terephthalate, polyethylene naphthalate, polycarbonate, polyimide, cycloolefin films, poly(methyl methacrylate), or a combination thereof. The second substrate may be a film, such as a single layer film or multilayer film having either a smooth surface or structured surface. Suitable structured surfaces include microstructured surfaces or embossed surfaces. Typically, a second substrate is employed to remove an adhesive from the actinic radiation-transparent substrate following irradiation from the actinic radiation. The second substrate 22 can be secured adjacent to and separate from the actinic radiation-transparent substrate 10 using a roller 23 or other suitable means.

In certain embodiments, the apparatus 100 further comprises a scraper 24 configured to scrape the substrate and/or a tacky roller 26 configured to clean the substrate. Other cleaning mechanisms for removing adhesive and/or unpolymerized composition from the substrate could alternatively be employed to prepare the substrate for the deposition of additional composition on its major surface, e.g., washing with a solvent. Moreover, in certain embodiments the substrate comprises a release material coated on the major surface of the substrate to enhance the ease of removal of the adhesive formed on the substrate. Suitable release materials include for instance and without limitation, silicone materials and low adhesion coatings. One example of a suitable low adhesion coating can be coated as a solution of polyvinyl N-octadecyl carbamate and a blend of silicone resins, as described in U.S. Pat. No. 5,531,855 (Heinecke et al.)

In many embodiments, the actinic radiation-transparent substrate 10 is in the form of a cylinder. The means for depositing 14 a composition 16 on a cylindrical substrate 10 may comprise rotating the cylinder (e.g., actinic radiation-transparent substrate) through a volume of the composition 16 to apply the composition 16 on the major surface 11 of the substrate 10. Advantageously, it is not always necessary to have strict control over the thickness of a composition that is deposited on the substrate because the irradiation dosage from the irradiation source is selected to polymerize a predetermined shape and size of the composition, as opposed to polymerizing through an entire thickness of the composition regardless of its particular depth.

In certain embodiments of methods according to the present disclosure, in use the apparatus shown in FIG. 1 is operated as follows: A means for conveying 18 the actinic radiation-transparent substrate 10 rotates the actinic radiation-transparent substrate 10 through the means for depositing 14 a composition 16, thereby depositing the composition 16 on the major surface 11 of the substrate 10 with which it contacts. An irradiation source 12 directs radiation through the actinic radiation-transparent substrate 10 at one or more predetermined dosages at one or more predetermined locations. The composition 16 that has been irradiated at least partially polymerizes, forming at least one adhesive, such as the adhesive 17 and the adhesive 19, shown in FIG. 1. For example, the adhesive 17 comprises a variation in thickness as a result of the specific irradiation provided by the irradiation source 12. As the substrate 10 continues to rotate (in the direction of the arrow, for instance), an air knife 20 directs air towards the major surface 11 of the substrate 10 to assist in removing the composition 16 remaining on the major surface 11 of the substrate 10 that was not polymerized to form an adhesive. The excess composition 16 is preferably returned to the container 14 via gravity once it is no longer deposited on the substrate 10. Once a formed adhesive (e.g., the adhesive 27 and the adhesive 29) reaches the second substrate 22 via rotation of the actinic radiation-transparent substrate 10, the adhesive (27, 29) is transferred from the major surface 11 of the substrate 10 to a major surface 25 of the second substrate 22. As the substrate 10 continues to rotate, a scraper 24 contacts the major surface 11 of the substrate 10 and removes residual adhesive from the substrate 10. Further, a tacky roller 26 contacts the major surface 11 of the substrate and removes residual adhesive from the substrate 10. It will be understood that not every apparatus 100 will include both or either of a scraper 24 and a tacky roller 26, as these can be optional components.

For instance, referring to the first aspect, a method may include obtaining an actinic radiation-polymerizable adhesive precursor composition 16 disposed on a major surface 11 of an actinic radiation-transparent substrate 10 and irradiating a first portion of the actinic radiation-polymerizable adhesive precursor composition through the actinic radiation-transparent substrate 10 for a first irradiation dosage to form a first adhesive 19. The method further includes moving the actinic radiation-transparent substrate 10 and irradiating a second portion of the actinic radiation-polymerizable adhesive precursor composition through the actinic radiation-transparent substrate 10 for a second irradiation dosage to form a second adhesive 17. In embodiments in which the method further includes irradiating a third portion of the actinic radiation-polymerizable adhesive precursor composition through the actinic radiation-transparent substrate 10 for a third irradiation dosage prior to moving the substrate, and the first portion and the third portion are adjacent to or overlapping with each other, an integral adhesive 19 is formed comprising a variable thickness in an axis normal to the actinic radiation-transparent substrate 10 when the first irradiation dosage and the third irradiation dosage are not the same.

Referring to the second aspect, a method may include obtaining an actinic radiation-polymerizable adhesive precursor composition 16 disposed on a major surface 11 of an actinic radiation-transparent substrate 10 and irradiating a first portion of the actinic radiation-polymerizable adhesive precursor composition through the actinic radiation-transparent substrate 10 for a first irradiation dosage. The method further includes irradiating a second portion of the actinic radiation-polymerizable adhesive precursor composition through the actinic radiation-transparent substrate for a second irradiation dosage and moving the actinic radiation-transparent substrate. The first portion and the second portion are adjacent to or overlapping with each other and the first irradiation dosage and the second irradiation dosage are not the same, thereby forming an integral adhesive 19 having a variable thickness in an axis normal to the actinic radiation-transparent substrate 10.

Figure 2:
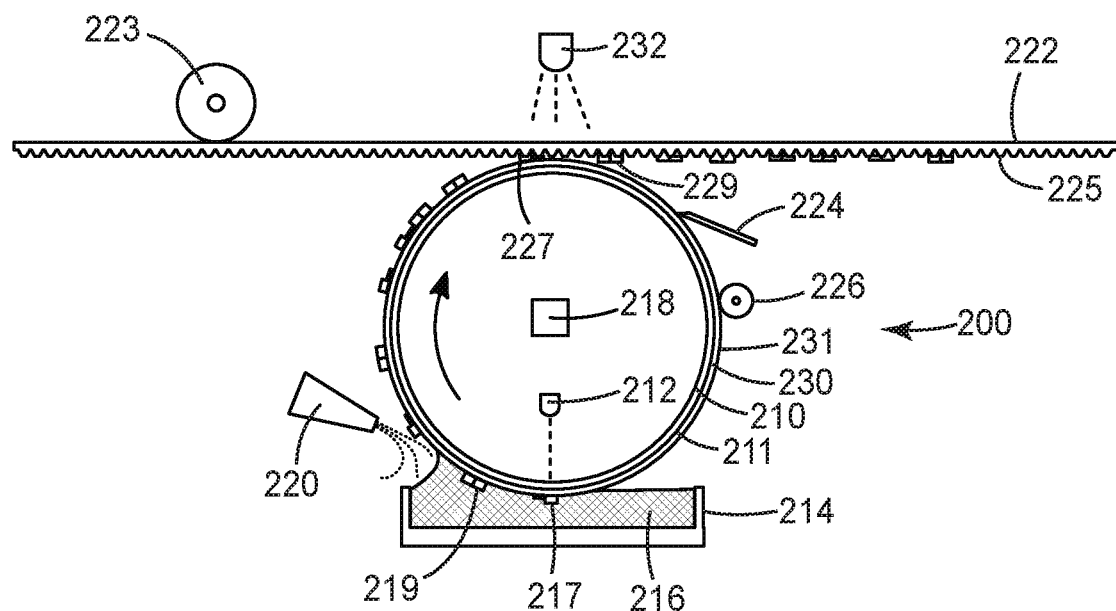
FIG. 2 is a schematic cross-sectional view of an apparatus for use in another exemplary method according to the present disclosure.

Referring now to FIG. 2, a schematic of an apparatus 200 for use in exemplary methods of the present disclosure is provided. The apparatus includes an actinic radiation-transparent substrate 210 having a major surface 211 and an irradiation source 212 configured to direct actinic radiation through the actinic radiation-transparent substrate 210 at predetermined dosages at predetermined locations. The apparatus 200 further includes a means for depositing 214 a composition 216 onto the major surface 211 of the actinic radiation-transparent substrate 210 and a means for conveying 218 the actinic radiation-transparent substrate 210 or the irradiation source 212 with respect to each other. The schematic of the apparatus 200 shown in FIG. 2 further comprises an air knife 220 configured to remove nonpolymerized composition 216 from the substrate 210. Also, the apparatus 200 of certain embodiments includes a second irradiation source 232 configured to irradiate one or more adhesives (e.g., the adhesive 227 and the adhesive 229) through a second substrate 222 as they pass by the second irradiation source 232. Typically, the use of a second irradiation source 232 is effective to post-cure the one or more adhesives. The second substrate 222 is often a consumable material obtained separately from the apparatus, and in the illustrated embodiment, comprises a structured sheet, in which at least one major surface 225 of the sheet is structured (as opposed to flat and featureless). The second substrate 222 can be secured adjacent to and separate from the actinic radiation-transparent substrate 210 using a roller 223 or other suitable means. The apparatus 200 shown in FIG. 2 further includes an actinic radiation-transparent film 230 having a major surface 231. The actinic radiation-transparent film 230 is wrapped at least partially around the actinic radiation-transparent substrate 210, and acts to protect the major surface 211 of the substrate 210 from residual composition 216 and adhesive material resistant to cleaning.

In use, the apparatus 200 operates similarly to the apparatus 100 of FIG. 1 described above, including that the composition 216 that has been irradiated at least partially polymerizes, forming at least one adhesive, such as the adhesive 217 and the adhesive 219. Once a formed adhesive (e.g., the adhesive 227 and the adhesive 229) reaches a second substrate 222 via rotation of the actinic radiation-transparent substrate 210, the adhesive (227, 229) is transferred from the major surface 211 of the substrate 210 to a major surface 225 of the second substrate 222. Further, in certain embodiments, the formed adhesive (227, 229) is irradiated by the second irradiation source 232 to post-cure the adhesive prior to transfer from the (first) substrate 210 to the second substrate 222.

Figure 3:
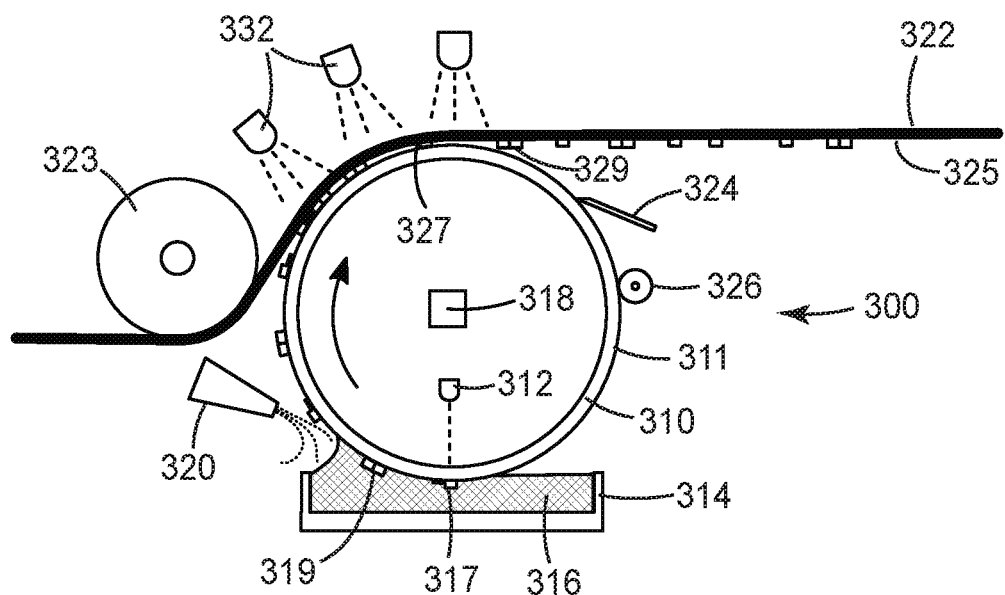
FIG. 3 is a schematic cross-sectional view of an apparatus for use in a further exemplary method according to the present disclosure.

Referring to FIG. 3, a schematic of an apparatus 300 for use in exemplary methods of the present disclosure is provided. The apparatus includes an actinic radiation-transparent substrate 310 having a major surface 311 and an irradiation source 312 configured to direct actinic radiation through the actinic radiation-transparent substrate 310 at predetermined dosages at predetermined locations. The apparatus 300 further includes a means for depositing 314 a composition 316 onto the major surface 311 of the actinic radiation-transparent substrate 310 and a means for conveying 318 the actinic radiation-transparent substrate 310 or the irradiation source 312 with respect to each other. The schematic of the apparatus 300 shown in FIG. 3 further comprises an air knife 320 configured to remove nonpolymerized composition 316 from the substrate 310, as well as a plurality of second irradiation sources 332 configured to irradiate one or more adhesives (e.g., the adhesive 327 and the adhesive 329) through a second substrate 322 as they pass by the second irradiation source 332. Typically, the use of at least one second irradiation source 332 is effective to post-cure the one or more adhesives. The second substrate 322 is often a consumable material obtained separately from the apparatus, and in the illustrated embodiment, comprises a smooth sheet. The second substrate 322 can be secured adjacent to and separate from the actinic radiation-transparent substrate 310 using a roller 323 or other suitable means. In certain embodiments, the apparatus 300 further comprises a scraper 324 configured to scrape the substrate 310 and/or a tacky roller 326 configured to clean the substrate 310.

In use, the apparatus 300 operates similarly to the apparatus 100 of FIG. 1 described above, including that the composition 316 that has been irradiated at least partially polymerizes, forming at least one adhesive, such as the adhesive 317 and the adhesive 319. Once a formed adhesive (e.g., the adhesive 327 and the adhesive 329) reaches a second substrate 322 via rotation of the actinic radiation-transparent substrate 310, the adhesive (327, 329) is transferred from the major surface 311 of the substrate 310 to a major surface 325 of the second substrate 322. Further, in certain embodiments, the formed adhesive (327, 329) is irradiated by one or more second irradiation sources 332 to post-cure the adhesive prior to transfer from the (first) substrate 310 to the second substrate 322.

Figure 4:
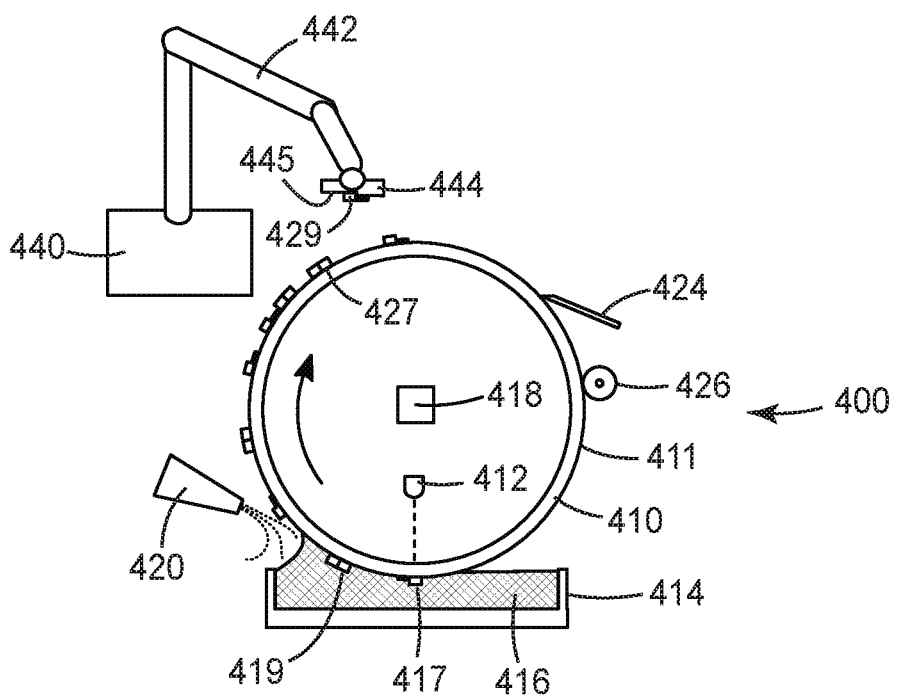
FIG. 4 is a schematic cross-sectional view of an apparatus for use in yet another exemplary method according to the present disclosure.

Referring to FIG. 4, a schematic of an apparatus 400 for use in exemplary methods of the present disclosure is provided. The apparatus includes an actinic radiation-transparent substrate 410 having a major surface 411 and an irradiation source 412 configured to direct actinic radiation through the actinic radiation-transparent substrate 410 at predetermined dosages at predetermined locations. The apparatus 400 further includes a means for depositing 414 a composition 416 onto the major surface 411 of the actinic radiation-transparent substrate 410 and a means for conveying 418 the actinic radiation-transparent substrate 410 or the irradiation source 412 with respect to each other. Optionally, an air knife 420 configured to remove nonpolymerized composition 416 from the substrate 410 is provided with the apparatus. The schematic of the apparatus 400 shown in FIG. 4 further comprises a mechanism 440 configured to remove one or more adhesives (e.g., the adhesive 429) through a second substrate 422 as they pass by the mechanism. For instance, the mechanism can be a robotic mechanism having a movable arm 442 and a replaceable end effector 444 configured to detach one or more adhesives 429 from the actinic radiation-transparent substrate 410. In the embodiment shown in FIG. 4, the end effector 444 comprises a major surface 445 configured to be shaped to be an inverse of the shape of an upper major surface of the adhesive 429. The mechanism 440 is typically configured to place the adhesive 429 in a location separate from the apparatus 400, such as on another substrate, on a device, on a release liner, in a storage container, etc. In certain embodiments, the apparatus 400 further comprises a scraper 424 configured to scrape the substrate 410 and/or a tacky roller 426 configured to clean the substrate 410.

In use, the apparatus 400 operates similarly to the apparatus 100 of FIG. 1 described above, including that the composition 416 that has been irradiated at least partially polymerizes, forming at least one adhesive, such as the adhesive 417 and the adhesive 419. However, once a formed adhesive (e.g., the adhesive 427 and the adhesive 429) reaches the mechanism 440 via rotation of the actinic radiation-transparent substrate 410, the adhesive (427, 429) is transferred from the major surface 411 of the substrate 410 to a major surface 445 of the end effector 444 of the mechanism 440.

Figure 5:
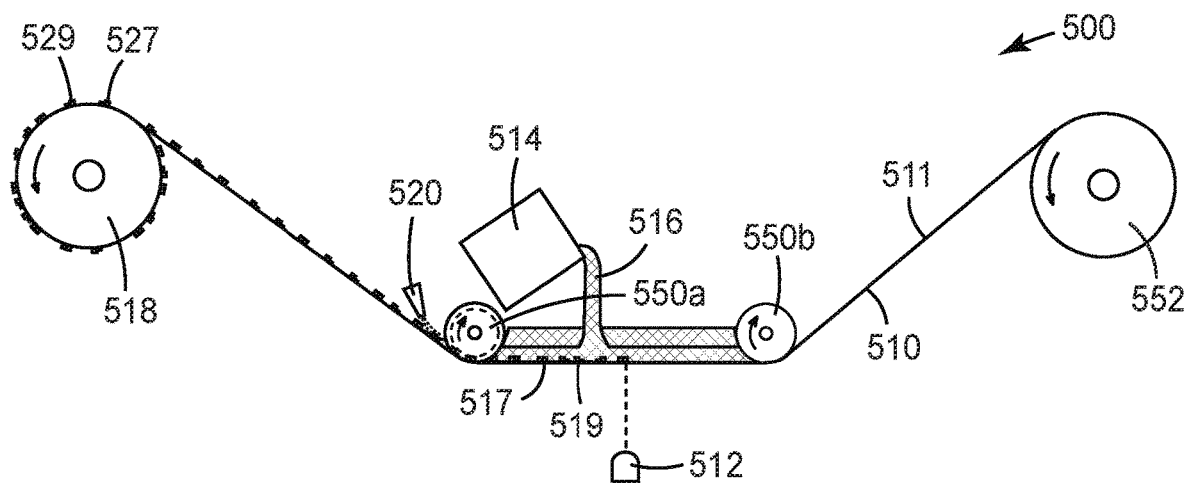
FIG. 5 is a schematic cross-sectional view of an apparatus for use in a still further exemplary method according to the present disclosure.

Referring to FIG. 5, a schematic of an apparatus 500 for use in exemplary methods of the present disclosure is provided. The apparatus includes at least two rollers 552 and 518 (at least one of which is configured to convey an actinic radiation-transparent substrate 510), and an irradiation source 512 configured to direct actinic radiation through the actinic radiation-transparent substrate 510 at predetermined dosages at predetermined locations. The apparatus 500 further includes a means for depositing 514 a composition 516 onto a major surface 511 of the actinic radiation-transparent substrate 510 and a means for conveying 518 the actinic radiation-transparent substrate 510 or the irradiation source 512 with respect to each other. The means for depositing 514 comprises a container configured to dispense the composition 516 as a pool on the major surface 511 of the substrate 510. The actinic radiation-transparent substrate 510 is often a consumable material obtained separately from the apparatus as opposed to being a component of the apparatus. Optionally, an air knife 520 configured to remove nonpolymerized composition 516 from the substrate 510 where one or more adhesives 517 and 519 are formed is provided with the apparatus 500.

In certain embodiments, in use the apparatus shown in FIG. 5 is operated as follows: A means for conveying 518 the actinic radiation-transparent substrate 510 drives a web of the actinic radiation-transparent substrate 510 through a plurality of rollers 550 that form a containment area to hold the composition 516 supplied by the means for depositing 514 the composition 516 on the major surface 511 of the substrate 510 with which it contacts. The means for depositing 514 in this embodiment is a container disposed above the actinic radiation-transparent substrate 510. An irradiation source 512 directs radiation through the actinic radiation-transparent substrate 510 at one or more predetermined dosages at one or more predetermined locations. The composition 516 that has been irradiated at least partially polymerizes, forming at least one adhesive, such as the adhesive 517 and the adhesive 519, shown in FIG. 5. For example, the adhesive 517 comprises a variation in width as compared to the adhesive 519, as a result of the specific irradiation provided by the irradiation source 512. As the substrate 510 continues to be driven from an unwind roller 552 to the means for conveying 518 (e.g., a wind roller as shown in FIG. 5), an air knife 520 directs air towards the major surface 511 of the substrate 510 to assist in removing the composition 516 remaining on the major surface 511 of the substrate 510 that was not polymerized to form an adhesive. The excess composition 516 is preferably returned to the containment area defined by the plurality of rollers 550. Once a formed adhesive (e.g., the adhesive 527 and the adhesive 529) reaches the wind roller 518, the web of actinic radiation transparent substrate 510 is wound up.

Figure 6:
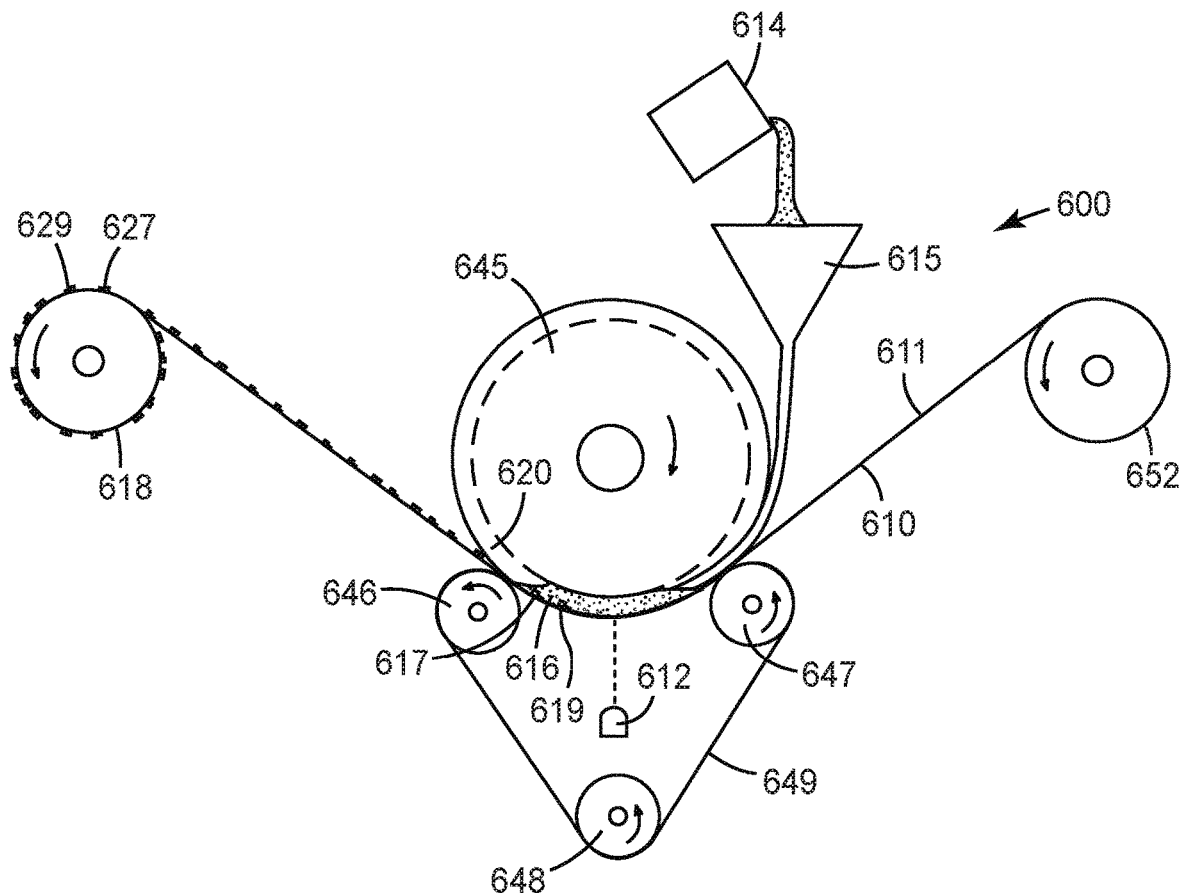
FIG. 6 is a schematic cross-sectional view of an apparatus for use in an additional exemplary method according to the present disclosure.

Referring to FIG. 6, a schematic of an apparatus 600 for use in exemplary methods of the present disclosure is provided. The apparatus includes at least two rollers 652 and 618 (at least one of which is configured to convey an actinic radiation-transparent substrate 610), and an irradiation source 612 configured to direct actinic radiation through the actinic radiation-transparent substrate 610 at predetermined dosages at predetermined locations. The apparatus 600 further includes a means for depositing 614 a composition 616 onto a major surface 611 of the actinic radiation-transparent substrate 610 and a means for conveying 618 the actinic radiation-transparent substrate 610 or the irradiation source 612 with respect to each other. The actinic radiation-transparent substrate 610 is often a consumable material obtained separately from the apparatus as opposed to being a component of the apparatus. The means for depositing 614 comprises a container configured to dispense the composition 616 through a funnel 615 and as a pool on the major surface 611 of the substrate 611. The apparatus further includes a dam roller 645 comprising a pair of spaced apart edges (not shown) configured to contact the actinic radiation-transparent substrate 610 and define a containment area between the edges to provide space for the pool of composition 616 disposed on the actinic radiation-transparent substrate 610.

A further means may be provided to contact the dam roller 645 with the actinic radiation-transparent substrate 610 to assist in minimizing leakage of the composition 616 off the actinic radiation-transparent substrate 610. In the apparatus shown in FIG. 6, such a means includes three press rollers 646, 647, and 648 and a belt 649, in which two of the press rollers 646, 647 are disposed adjacent to the dam roller 645 and the third press roller 648 is disposed at a distance from the first two press rollers 646, 647. The belt 649 is configured in a loop around the three press rollers 646, 647, and 648 and disposed in contact with the actinic radiation-transparent substrate 610. The three press rollers 646, 647, and 648 are configured to apply force to the belt to maintain it in contact with the actinic radiation-transparent substrate 610. As the actinic radiation-transparent substrate 610 is conveyed, the belt 649 traverses around the three press rollers 646, 647, and 648.

In use, the apparatus 600 operates similarly to the apparatus 500 of FIG. 5 described above, including that as the substrate 610 continues to be driven from an unwind roller 652 (as well as under the dam roller 645) to the means for conveying 618 (e.g., a wind roller as shown in FIG. 6), an air knife 620 directs air towards the major surface 611 of the substrate 610 to assist in removing the composition 616 remaining on the major surface 611 of the substrate 610 that was not polymerized to form an adhesive by irradiation from the actinic irradiation source 612. The excess composition 616 is preferably returned to the containment area defined by the dam roller 645. Once a formed adhesive (e.g., the adhesive 627 and the adhesive 629) reaches the wind roller 618, the web of actinic radiation transparent substrate 610 is wound up.

Figure 7:
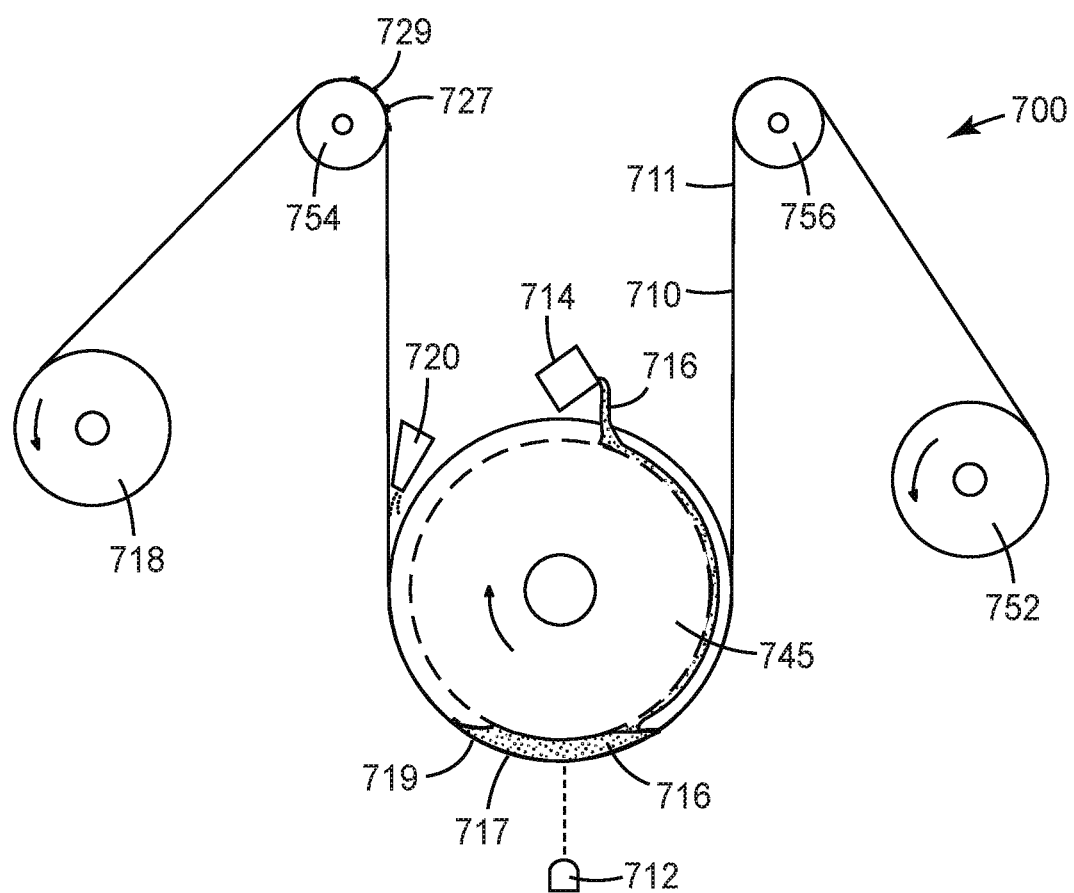
FIG. 7 is a schematic cross-sectional view of an apparatus for use in still another exemplary method according to the present disclosure.

Referring to FIG. 7, a schematic of an apparatus 700 for use in exemplary methods of the present disclosure is provided. The apparatus includes at least two rollers 752 and 718 (at least one of which is configured to convey an actinic radiation-transparent substrate 710) configured to convey an actinic radiation-transparent substrate 710 and an irradiation source 712 configured to direct actinic radiation through the actinic radiation-transparent substrate 710 at predetermined dosages at predetermined locations. The apparatus 700 further includes a means for depositing 714 a composition 716 onto a major surface 711 of the actinic radiation-transparent substrate 710 and a means for conveying 718 the actinic radiation-transparent substrate 710 or the irradiation source 712 with respect to each other. The actinic radiation-transparent substrate 710 is often a consumable material obtained separately from the apparatus 700 as opposed to being a component of the apparatus. The apparatus further includes a dam roller 745 comprising a pair of spaced apart edges (not shown) configured to contact the actinic radiation-transparent substrate 710 and define a containment area between the edges to provide space for the pool of composition 716 disposed on the actinic radiation-transparent substrate 710. The means for depositing 714 comprises a container configured to dispense the composition 716 as a thin layer onto a surface of the dam roller 745, which travels around the dam roller 745 and forms a pool on the major surface 711 of the substrate 710.

A further means may be provided to contact the dam roller 745 with the actinic radiation-transparent substrate 710 to assist in minimizing leakage of the composition 716 off the actinic radiation-transparent substrate 710. In the apparatus shown in FIG. 7, such a means includes two tension rollers 754 and 756, wherein the actinic radiation-transparent substrate 710 is fed over one tension roller 756, under the dam roller 745, and over the other tension roller 754. This configuration allows the tension rollers 754 and 756 to be configured to apply force to the actinic radiation-transparent substrate 710 to maintain the substrate 710 in contact with the dam roller 745 as the actinic radiation-transparent substrate 710 is conveyed through the apparatus.

In use, the apparatus 700 operates similarly to the apparatus 500 of FIG. 5 described above, including that as the substrate 710 continues to be driven from an unwind roller 752 (as well as over the first tension roller 756, under the dam roller 745, and over the second tension roller 754) to the means for conveying 718 (e.g., a wind roller as shown in FIG. 7), an air knife 720 directs air towards the major surface 711 of the substrate 710 to assist in removing the composition 716 remaining on the major surface 711 of the substrate 710 that was not polymerized to form an adhesive by irradiation from the actinic irradiation source 712. The excess composition 716 is preferably returned to the containment area defined by the dam roller 745. Once a formed adhesive (e.g., the adhesive 727 and the adhesive 729) reaches the wind roller 718, the web of actinic radiation transparent substrate 710 is wound up.

Figure 8:
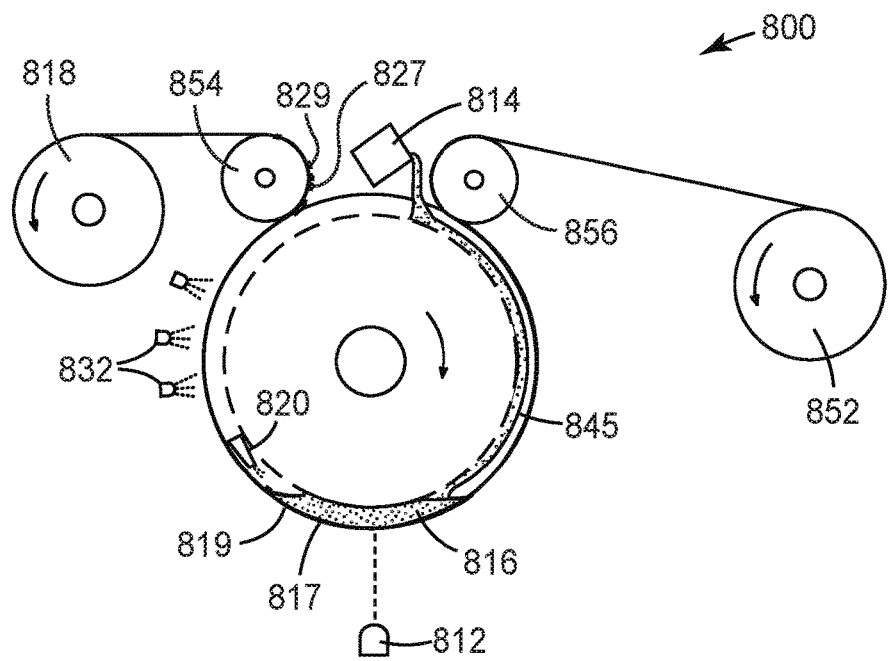
FIG. 8 is a schematic cross-sectional view of an apparatus for use in yet a further exemplary method according to the present disclosure.

Referring to FIG. 8, a schematic of an apparatus 800 for use in exemplary methods of the present disclosure is provided. The apparatus includes at least two rollers 852 and 818 (at least one of which is configured to convey an actinic radiation-transparent substrate 810) configured to convey an actinic radiation-transparent substrate 810 and an irradiation source 812 configured to direct actinic radiation through the actinic radiation-transparent substrate 810 at predetermined dosages at predetermined locations. The apparatus 800 further includes a means for depositing 814 a composition 816 onto a major surface 811 of the actinic radiation-transparent substrate 810 and a means for conveying 818 the actinic radiation-transparent substrate 810 or the irradiation source 812 with respect to each other. The actinic radiation-transparent substrate 810 is often a consumable material obtained separately from the apparatus 800 as opposed to being a component of the apparatus. The apparatus further includes a dam roller 845 comprising a pair of spaced apart edges (not shown) configured to contact the actinic radiation-transparent substrate 810 and define a containment area between the edges to provide space for the pool of composition 816 disposed on the actinic radiation-transparent substrate 810. The means for depositing 814 comprises a container configured to dispense the composition 816 as a thin layer onto a surface of the dam roller 845, which travels around the dam roller 845 and forms a pool on the major surface 811 of the substrate 810.

A further means may be provided to contact the dam roller 845 with the actinic radiation-transparent substrate 810 to assist in minimizing leakage of the composition 816 off the actinic radiation-transparent substrate 810. In the apparatus shown in FIG. 8, such a means includes two tension rollers 854 and 856, wherein the actinic radiation-transparent substrate 810 is fed over one tension roller 856, under the dam roller 845, and over the other tension roller 854. This configuration allows the tension rollers 854 and 856 to be configured to apply force to the actinic radiation-transparent substrate 810 to maintain the substrate 810 in contact with the dam roller 845 as the actinic radiation-transparent substrate 810 is conveyed through the apparatus. In the apparatus shown in FIG. 8, the tension rollers are disposed adjacent to the dam roller 845 such that the actinic radiation-transparent substrate 810 is in contact with over 50 percent of the circumference of the dam roller 845 to further assist in minimizing leakage of the composition 816 off the actinic radiation-transparent substrate 810.

In use, the apparatus 800 operates similarly to the apparatus 500 of FIG. 5 described above, including that as the substrate 810 continues to be driven from an unwind roller 852 (as well as over the first tension roller 856, under the dam roller 845, and over the second tension roller 854) to the means for conveying 818 (e.g., a wind roller as shown in FIG. 8). Further, in certain embodiments, the formed adhesive (e.g., 827, 829) is irradiated by one or more second irradiation sources 832 to post-cure the adhesive prior to winding up the substrate 810. An air knife 820 optionally directs air towards the major surface 811 of the substrate 810 to assist in removing the composition 816 remaining on the major surface 811 of the substrate 810 that was not polymerized to form an adhesive by irradiation from the actinic irradiation source 812. The excess composition 816 is preferably returned to the containment area defined by the dam roller 845. Once a formed adhesive (e.g., the adhesive 827 and the adhesive 829) reaches the wind roller 818, the web of actinic radiation transparent substrate 810 is wound up.

Figure 9:
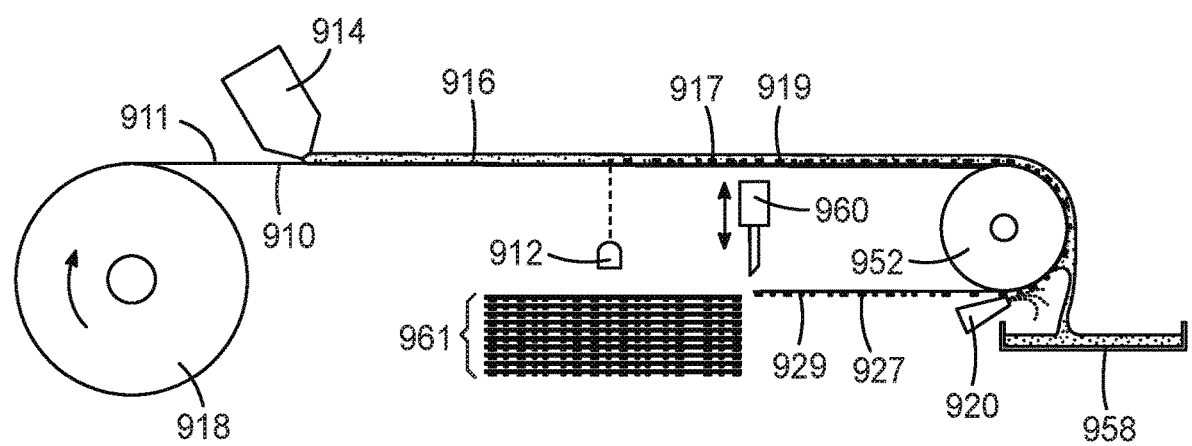
FIG. 9 is a schematic cross-sectional view of an apparatus for use in another additional exemplary method according to the present disclosure.

Referring to FIG. 9, a schematic of an apparatus 900 for use in exemplary methods of the present disclosure is provided. The apparatus includes at least two rollers 952 and 918 (at least one of which is configured to convey an actinic radiation-transparent substrate 910), and an irradiation source 912 configured to direct actinic radiation through the actinic radiation-transparent substrate 910 at predetermined dosages at predetermined locations. The apparatus 900 further includes a means for depositing 914 a composition 916 onto a major surface 911 of the actinic radiation-transparent substrate 910 and a means for conveying 918 the actinic radiation-transparent substrate 910 or the irradiation source 912 with respect to each other. The means for depositing 914 comprises a die configured to dispense the composition 916 on the major surface 911 of the substrate 910. In such embodiments, the composition 916 is preferably sufficiently viscous to remain on the major surface 911 of the substrate 910 without leaking off of the side edges of the substrate 910. The actinic radiation-transparent substrate 910 is often a consumable material obtained separately from the apparatus 900 as opposed to being a component of the apparatus. Optionally, an air knife 920 configured to remove nonpolymerized composition 916 from the substrate 910 where one or more adhesives 917 and 919 are formed is provided with the apparatus 900.

A further optional component of the apparatus 900 is a blade 960 that slices portions of the substrate 910 on which one or more adhesives (e.g., 927 and and/or 929) are disposed. In the embodiment shown in FIG. 9, a stack 961 of pieces of substrate 910 comprising one or more formed adhesives is illustrated. In an alternate embodiment, the substrate 910 on which one or more adhesives (e.g., 927 and/or 929) are formed are wound up on a wind roll (not shown).

In certain embodiments, in use the apparatus shown in FIG. 9 is operated as follows: A die 914 deposits a composition 916 on a major surface 911 of an actinic radiation-transparent substrate 910. An irradiation source 912 directs radiation through the actinic radiation-transparent substrate 910 at one or more predetermined dosages at one or more predetermined locations. The composition 916 that has been irradiated at least partially polymerizes, forming at least one adhesive, such as the adhesive 917 and the adhesive 919, shown in FIG. 9. For example, the adhesive 917 comprises a variation in width as compared to the adhesive 919, as a result of the specific irradiation provided by the irradiation source 912. A means for conveying 918 the actinic radiation-transparent substrate 910 drives a web of the actinic radiation-transparent substrate 910 over a roller 952 to allow gravity to begin separating the composition 916 that was not polymerized to form an adhesive (e.g., 917 and 919). As the substrate 910 continues to be driven from a first roller 918 to a second roller 952, an air knife 920 directs air towards the major surface 911 of the substrate 910 to assist in removing the composition 916 remaining on the major surface 911 of the substrate 910. The excess composition 916 is preferably deposited in a container 958 for recycling or reuse. Once a particular section of the substrate 910 holding at least one formed adhesive (e.g., the adhesive 927 and/or the adhesive 929) reaches the blade 960, the blade 960 is employed and that portion of actinic radiation transparent substrate 910 is sliced off (and optionally added to a stack 961 of substrate 910 pieces each comprising at least one formed adhesive 927.

Referring to each of FIGS. 1-9, the actinic radiation-transparent substrate comprises glass (e.g., in any of FIGS. 1-4) or a polymeric material (e.g., in any of FIGS. 1-9). When the actinic radiation-transparent substrate comprises a polymeric material, the substrate usually comprises a polymeric material selected from polyethylene terephthalate, polyethylene naphthalate, polycarbonate, polyimide, cycloolefin films, poly(methyl methacrylate), or combinations thereof. When the actinic radiation-transparent substrate comprises glass, the substrate usually comprises a glass selected from sodium borosilicate glass, soda-lime glass, and quartz glass. In certain embodiments, the substrate comprises a multilayer construction, for instance a polymeric sheet, an adhesive layer, and a liner. In embodiments in which the adhesive is intended to be transferred from the multilayer construction to another surface or substrate, the multilayer construction comprises a coating (e.g., a release coating) upon which the integral adhesive is disposed.

Each of FIGS. 1-9 referred to a means for conveying an actinic radiation-transparent substrate or an irradiation source with respect to each other. The means for conveying generally includes mechanical means as known in the manufacturing arts, such as a motor, a servo motor, a stepper motor, or any combinations thereof. Often, a motor ultimately drives one or more rollers, which convey a substrate (e.g., a cylinder or web of indefinite length) and/or the irradiation source.

Referring to each of FIGS. 1-9, the actinic radiation is typically provided by an irradiation source that is a digital light projector (DLP) with a light emitting diode (LED), a DLP with a lamp, a laser scanning device with a laser, a liquid crystal display (LCD) panel with a backlight, a photomask with a lamp, or a photomask with an LED. More particularly, a schematic is provided in FIG. 10 of a DLP with an LED or lamp, schematics are provided in FIGS. 11a and 11b of a photomask with a lamp or LED, a schematic is provided in FIG. 12 of an LCD panel with a backlight, and a schematic is provided in FIG. 13 of a laser scanning device with a laser.

Figure 10:
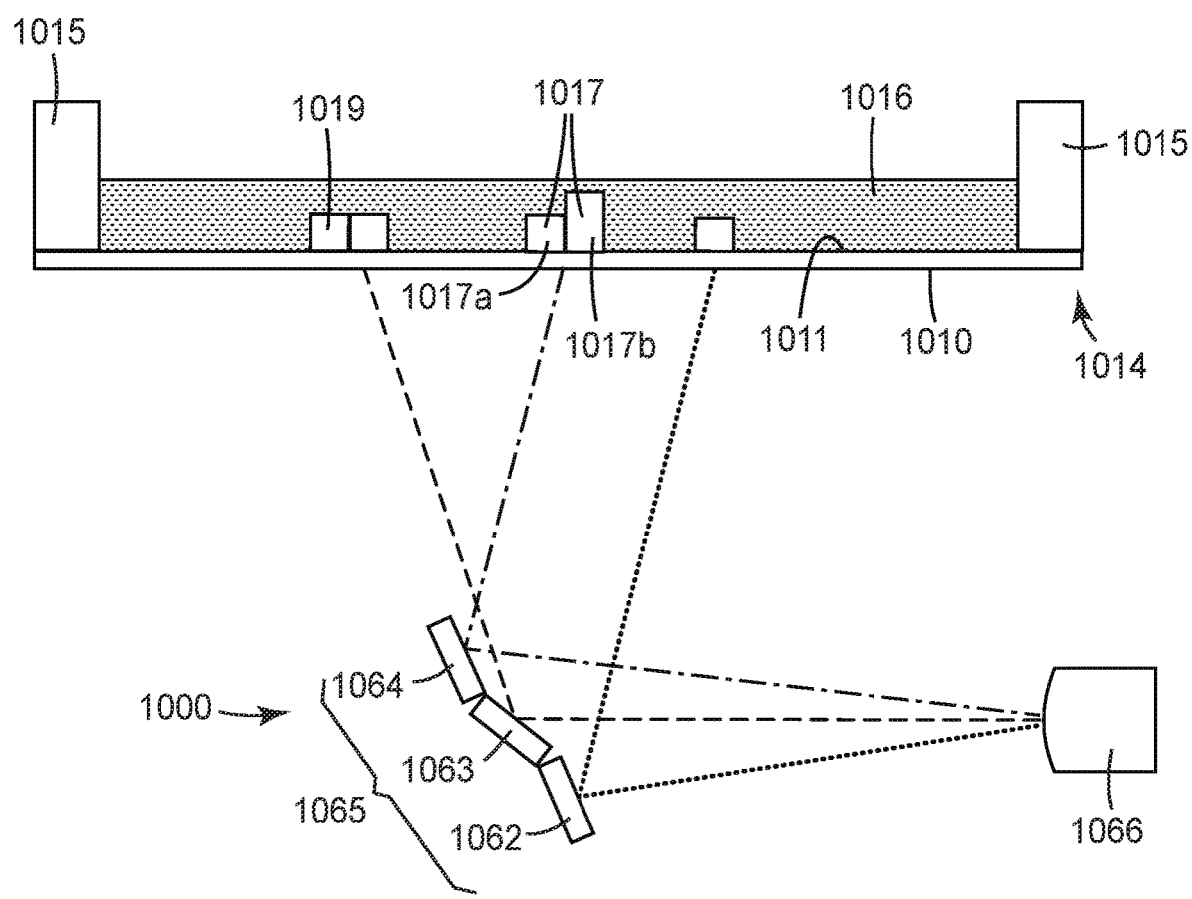
FIG. 10 is a schematic cross-sectional view of an exemplary irradiation source for use according to the present disclosure.

Referring now to FIG. 10, a schematic is provided of an irradiation source 1000 for use in exemplary methods of the present disclosure, comprising a DLP 1065 with an LED or a lamp 1066 (1066 represents either an LED or a lamp). The DLP 1065 includes a plurality of individually movable reflectors, such as first reflector 1062, second reflector 1063, and third reflector 1064. Each reflector is positioned at a specific angle to direct irradiation from the LED or lamp 1066 towards a predetermined location of a composition 1016 disposed on a major surface 1011 of an actinic radiation-transparent substrate 1010. In use, the intensity and duration of the irradiation from the LED or lamp 1066 will impact the depth of cure (e.g., polymerization) of the composition 1016 in a direction normal to the major surface 1011 of the substrate 1010 upon formation of one or more adhesives 1017 and 1019. For instance, one portion 1017b of integral adhesive 1017 has a greater thickness than another portion 1017a of the same integral adhesive 1017. This may be achieved by irradiating the portion 1017b with a greater dosage than the portion 1017a is irradiated. In contrast, adhesive 1019 has a single thickness across its width due to receiving the same dosage across its width. A benefit of employing a DLP is that the individual reflectors are readily adjustable (e.g., using computer controls) to change the irradiation location and dosage and thereby the shape of the resulting formed adhesives, as needed without requiring a significant equipment alteration. DLPs are well-known in the art, for instance and without limitation, the apparatuses described in U.S. Pat. No. 5,658,063 (Nasserbakht), U.S. Pat. No. 5,905,545 (Poradish et al.), U.S. Pat. No. 6,587,159 (Dewald), U.S. Pat. No. 7,164,397 (Pettitt et al.), U.S. Pat. No. 7,360,905 (Davis et al.), U.S. Pat. No. 8,705,133 (Lieb et al.), and U.S. Pat. No. 8,820,944 (Vasquez). Suitable DLPs are commercially available, such as from Texas Instruments (Dallas, Tex.). As indicated above, either an LED or a lamp may be employed with a DLP. Suitable lamps may include a flash lamp, a low pressure mercury lamp, a medium pressure mercury lamp, and/or a microwave driven lamp. The skilled practitioner can select a suitable LED or lamp light source to provide the actinic radiation required to initiate polymerization for a particular polymerizable composition, for instance, the UV LED CBT-39-UV, available from Luminus Inc. (Sunnyvale, Calif.).

Figure 11A:
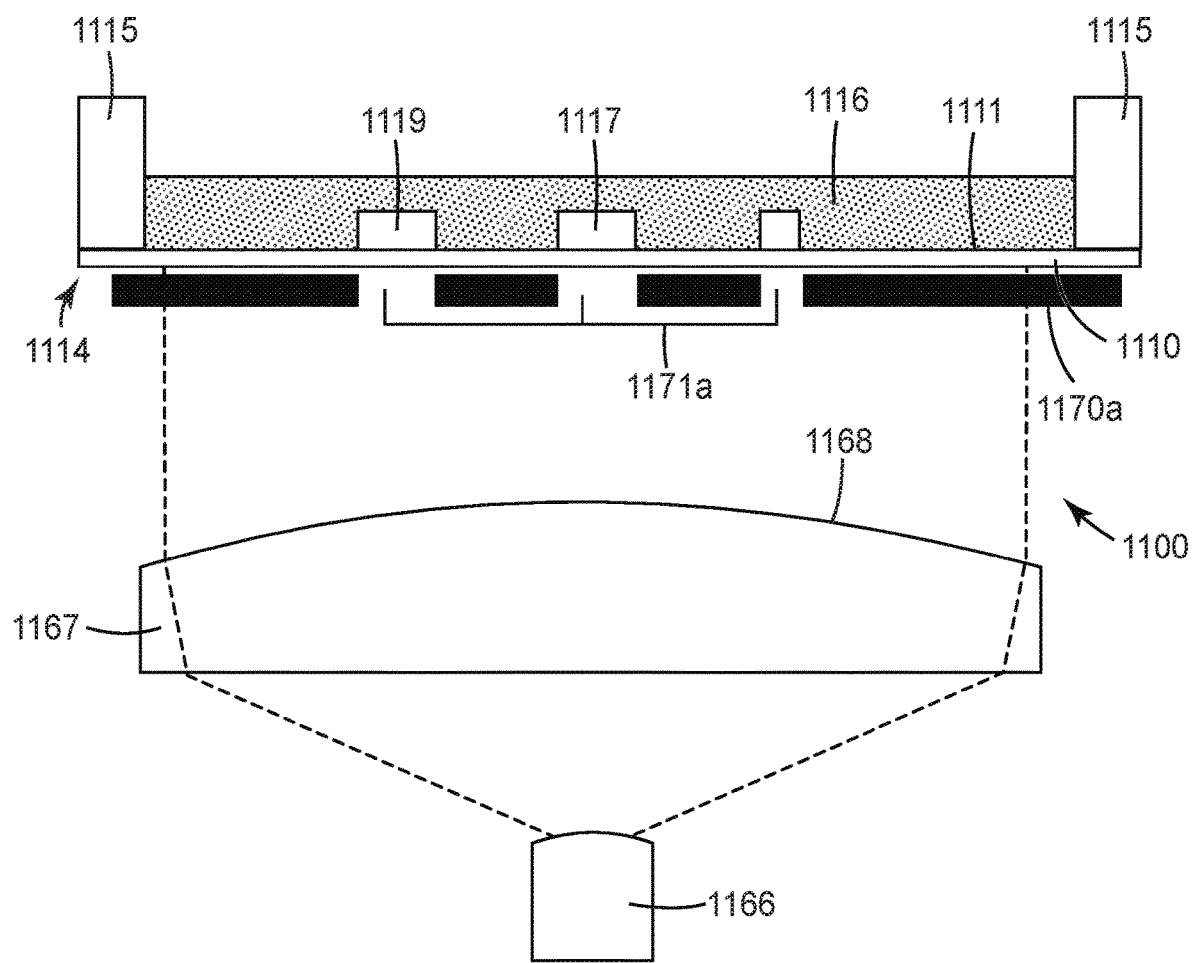
FIGS. 11a and 11b are schematic cross-sectional views of another exemplary irradiation source for use according to the present disclosure.
Figure 11B:
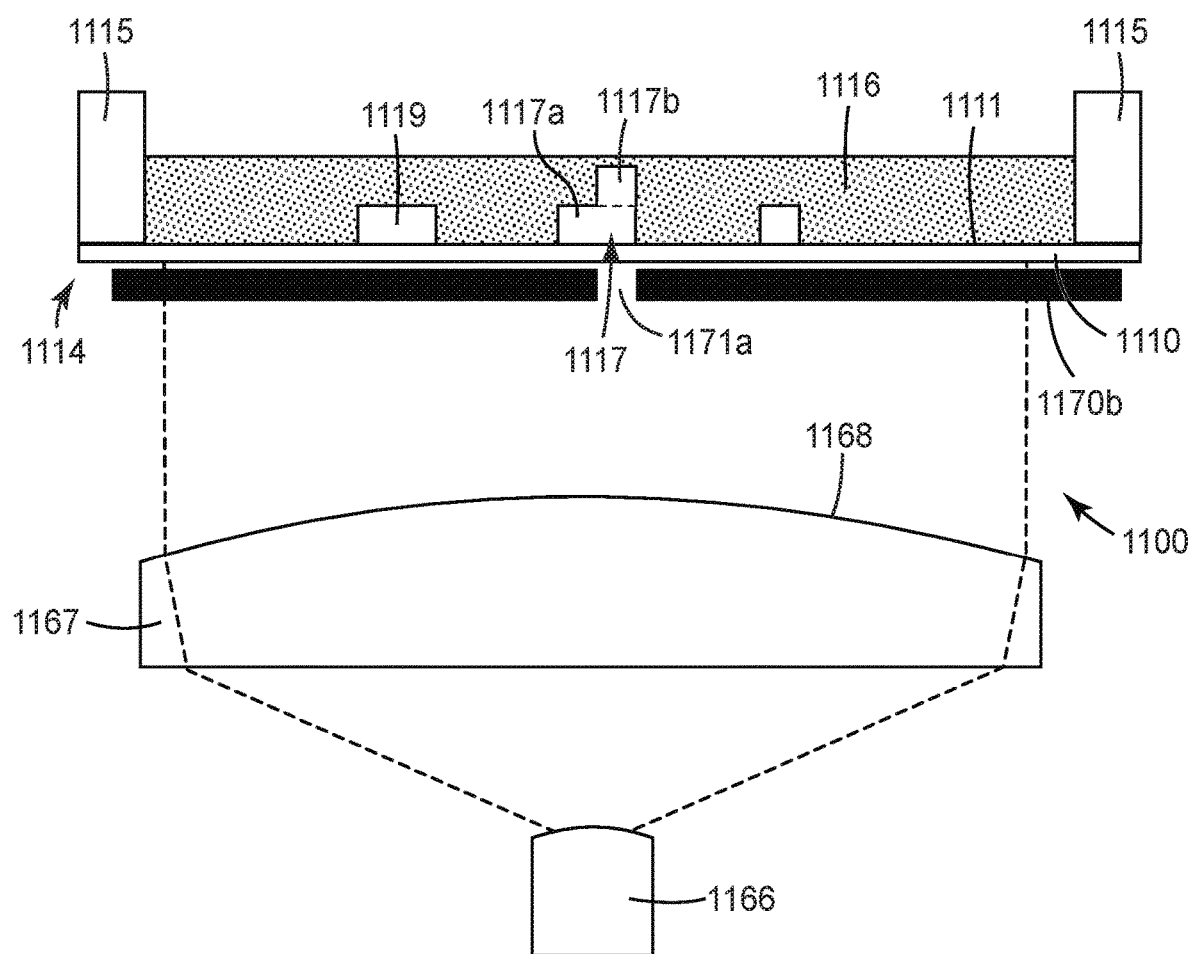

Referring now to FIGS. 11a and 11b, schematics are provided including an irradiation source 1100 comprising at least one photomask 1170a and 1170b with an LED or a lamp 1166 (1166 represents either an LED or a lamp), for use in exemplary methods of the present disclosure. A lens 1167 having a convex surface 1168 is employed with the LED or lamp 1166 to diffuse the irradiation across at least a portion of the one or more photomasks 1170a and 1170b. As shown in FIG. 11a, a first photomask 1170a is employed to direct irradiation from the LED or lamp 1166 towards a predetermined location of a composition 1116 disposed on a major surface 1111 of an actinic radiation-transparent substrate 1110. In use, the intensity and duration of the irradiation from the LED or lamp 1166 will impact the depth of cure (e.g., polymerization) of the composition 1116 in a direction normal to the major surface 1111 of the substrate 1110 upon formation of one or more adhesives 1117 and 1119. For instance, one portion 1117b of integral adhesive 1117 has a greater thickness than another portion 1017a of the same integral adhesive 1117. This may be achieved by employing more than one photomask. For instance, referring to FIG. 11a, a photomask 1170a is shown in which a plurality of portions 1171a are provided through which irradiation can be directed to cure the composition 1116. Referring now to FIG. 11a, a second photomask 1170b is shown in which one portion 1117b is provided through which irradiation can be directed to further cure the composition 1116. In the illustrated embodiment, the portion 1117b has a greater thickness than the portion 1117a due to being irradiated twice; once using the first photomask 1170a and once using the second photomask 1170b; resulting in irradiation of the portion 1117b with a greater dosage than the portion 1117a. In contrast, adhesive 1119 has a single thickness across its width due to receiving the same dosage across its width by exposure to irradiation through just the first photomask 1170a. While the photomasks in FIGS. 11a and 11b are shown as having opaque and transparent portions, the skilled practitioner will appreciate that photomasks including greyscale may be employed to achieve gradients in cure in different locations of the composition. Suitable photomasks are commercially available, for instance, NanoSculpt Photomasks from Infinite Graphics (Minneapolis, Minn.). Similar to using a DLP, either an LED or a lamp may be employed with a photomask.

Figure 12:
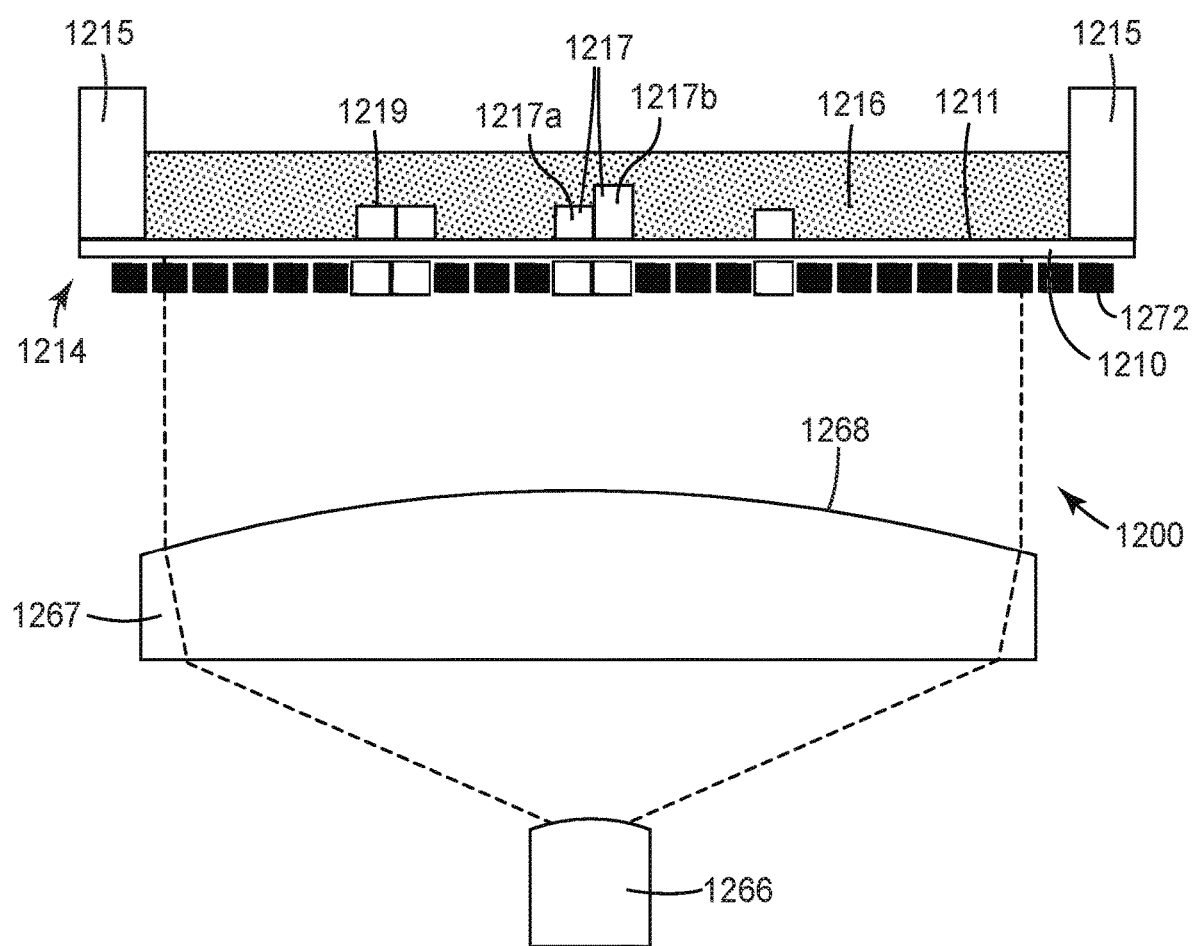
FIG. 12 is a schematic cross-sectional view of a further exemplary irradiation source for use according to the present disclosure.

Referring to FIG. 12, a schematic is provided of an irradiation source 1200 comprising a digital photomask 1272 (e.g., a LCD with a backlight 1266), wherein the backlight comprises an LED or a lamp 1266 (1266 represents either an LED or a lamp), for use in exemplary methods of the present disclosure. A lens 1267 having a convex surface 1268 is employed with the backlight 1266 to diffuse the irradiation across at least a portion of the digital photomask 1272. In use, the intensity and duration of the irradiation from the backlight 1266 will impact the depth of cure (e.g., polymerization) of the composition 1216 in a direction normal to the major surface 1211 of the substrate 1210 upon formation of one or more adhesives 1217 and 1219. For instance, one portion 1217b of integral adhesive 1217 has a greater thickness than another portion 1217a of the same integral adhesive 1217. This may be achieved by irradiating the portion 1217b with a greater dosage than the portion 1217a is irradiated. In contrast, adhesive 1219 has a single thickness across its width due to receiving the same dosage across its width. A benefit of employing a digital photomask is that the individual pixels are readily adjustable (e.g., using computer controls) to change the irradiation location and dosage and thereby the shape of the resulting formed adhesives, as needed without requiring a significant equipment alteration. Suitable LCDs are commercially available, for instance, the LCD LQ043T1DG28, available from Sharp Corporation (Osaka, Japan).

Figure 13:
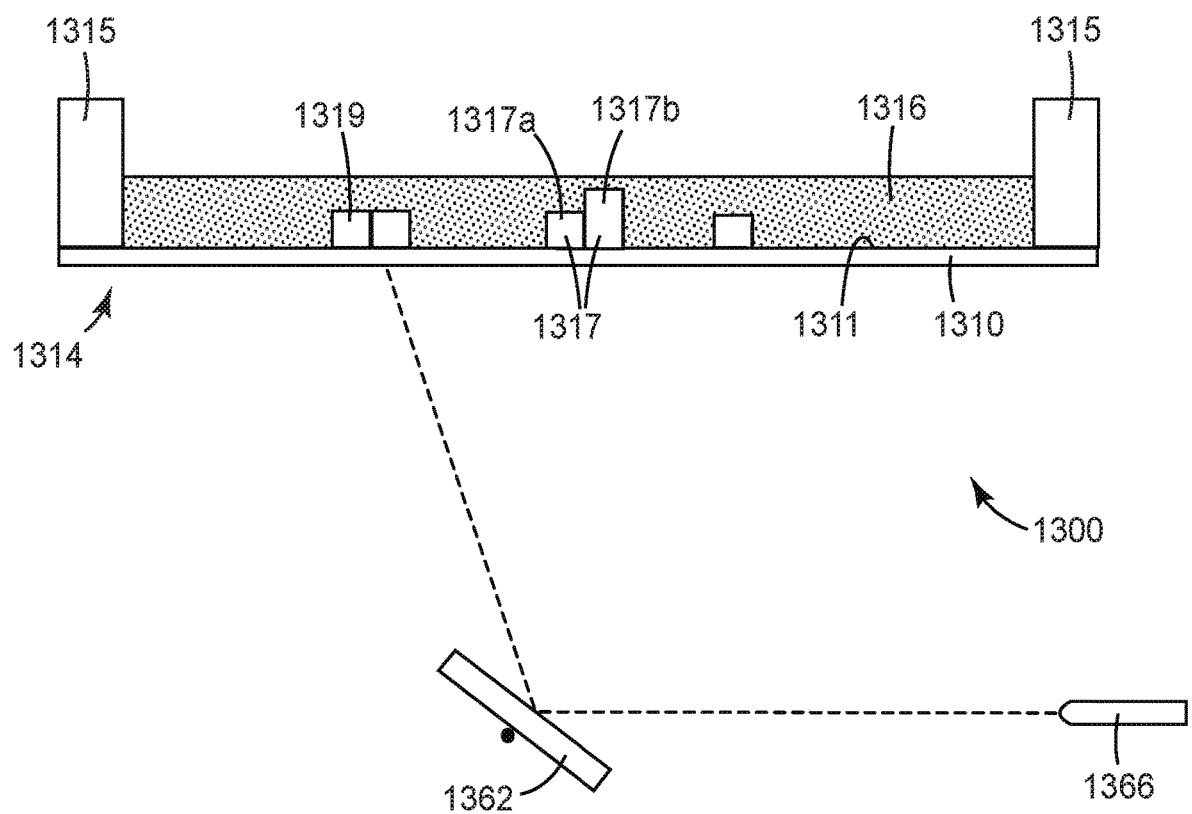
FIG. 13 is a schematic cross-sectional view of an additional exemplary irradiation source for use according to the present disclosure.

Referring to FIG. 13, a schematic is provided of an irradiation source 1300 comprising a laser scanning device 1362 with a laser 1366, for use in exemplary methods of the present disclosure. The laser scanning device 1362 includes at least one individually movable mirror. Each mirror is positioned at a specific angle to direct irradiation from the laser 1366 towards a predetermined location of a composition 1316 disposed on a major surface 1311 of an actinic radiation-transparent substrate 1310. In use, the intensity and duration of the irradiation from the laser 1366 will impact the depth of cure (e.g., polymerization) of the composition 1316 in a direction normal to the major surface 1311 of the substrate 1310 upon formation of one or more adhesives 1317 and 1319. For instance, one portion 1317b of integral adhesive 1317 has a greater thickness than another portion 1317a of the same integral adhesive 1317. This may be achieved by irradiating the portion 1317b with a greater dosage than the portion 1317a is irradiated. In contrast, adhesive 1319 has a single thickness across its width due to receiving the same dosage across its width. A benefit of employing a laser scanning device is that the individual mirror(s) are readily adjustable (e.g., using computer controls) to change the irradiation location and dosage and thereby the shape of the resulting formed adhesives, as needed without requiring a significant equipment alteration. Suitable laser scanning devices are commercially available, such as the JS2808 Galvanometer Scanner from Sino-Galvo (Beijing) Technology Co., LTD. (Beijing, China). The skilled practitioner can select a suitable laser to provide the actinic radiation required to initiate polymerization for a particular polymerizable composition, for instance, the CUBE 405-100C Diode Laser System from Coherent Inc. (Santa Clara, Calif.).

Accordingly, any of the above irradiation sources of the present disclosure are suitable for use in each of the apparatuses of the disclosed embodiments herein. It is an advantage of these irradiation sources that they are readily configured to provide one or more predetermined dosages of irradiation at one or more predetermined locations, allowing the manufacture of adhesives having variations in size and shape, particularly in thickness normal to a substrate.

EXEMPLARY EMBODIMENTS

Embodiment 1 is a method of manufacturing adhesives. The method includes obtaining an actinic radiation-polymerizable adhesive precursor composition disposed on a major surface of an actinic radiation-transparent substrate and irradiating a first portion of the actinic radiation-polymerizable adhesive precursor composition through the actinic radiation-transparent substrate for a first irradiation dosage to form a first adhesive. The method further includes moving the actinic radiation-transparent substrate and irradiating a second portion of the actinic radiation-polymerizable adhesive precursor composition through the actinic radiation-transparent substrate for a second irradiation dosage to form a second adhesive.

Embodiment 2 is the method of embodiment 1, further including irradiating a third portion of the actinic radiation-polymerizable adhesive precursor composition through the actinic radiation-transparent substrate to form a third adhesive prior to moving the substrate.

Embodiment 3 is the method of embodiment 1 or embodiment 2, wherein the first portion and the third portion are adjacent to or overlapping with each other.

Embodiment 4 is the method of any of embodiments 1 to 3, wherein the first irradiation dosage and the third irradiation dosage are not the same, thereby forming an integral adhesive comprising the first adhesive and the third adhesive, the integral adhesive comprising a variable thickness in an axis normal to the actinic radiation-transparent substrate.

Embodiment 5 is the method of any of embodiments 1 to 4, further including post-curing the first adhesive.

Embodiment 6 is the method of embodiment 5, wherein the post-curing includes using actinic radiation or heat.

Embodiment 7 is the method of any of embodiments 1 to 6, further including irradiating a fourth portion of the actinic radiation-polymerizable adhesive precursor composition through the actinic radiation-transparent substrate to form a fourth adhesive.

Embodiment 8 is the method of embodiment 7, wherein the second portion and the fourth portion are adjacent to or overlapping with each other, thereby forming a second integral adhesive comprising the second adhesive and the fourth adhesive, the second integral adhesive comprising a variable thickness in an axis normal to the major surface of the actinic radiation-transparent substrate.

Embodiment 9 is the method of any of embodiments 1 to 8, further including removing actinic radiation-polymerizable adhesive precursor composition from the first adhesive remaining in contact with the adhesive after the irradiating using a gas, a vacuum, a fluid, or a combination thereof.

Embodiment 10 is the method of any of embodiments 1 to 9, further comprising removing the first adhesive from the substrate.

Embodiment 11 is the method of embodiment 10, wherein the first adhesive is removed with a second substrate.

Embodiment 12 is the method of embodiment 11, wherein the second substrate comprises a structured sheet.

Embodiment 13 is the method of embodiment 10, including removing the first integral adhesive from the substrate with a robot.

Embodiment 14 is the method of any of embodiments 10 to 13, further including cleaning the substrate.

Embodiment 15 is the method of any of embodiments 1 to 14, wherein the substrate is coated with a release material.

Embodiment 16 is the method of any of embodiments 1 to 15, wherein the substrate includes glass or a polymeric material.

Embodiment 17 is the method of any of embodiments 1 to 16, wherein the substrate is in the form of a cylinder.

Embodiment 18 is the method of embodiment 17, including rotating the cylinder through a container holding the actinic radiation-polymerizable adhesive precursor composition to dispose the actinic radiation-polymerizable adhesive precursor composition on the substrate.

Embodiment 19 is the method of any of embodiments 1 to 16, wherein the precursor composition is disposed as a pool on the major surface of the substrate.

Embodiment 20 is the method of any of embodiments 1 to 19, wherein the time of irradiation of the first dosage is shorter than the time of irradiation of the second dosage.

Embodiment 21 is the method of any of embodiments 1 to 20, wherein the actinic radiation intensity of the first dosage is lower than the actinic radiation intensity of the second dosage.

Embodiment 22 is the method of any of embodiments 1 to 21, wherein irradiating the first portion occurs before irradiating the second portion.

Embodiment 23 is the method of any of embodiments 1 to 22, wherein irradiating the first portion occurs at the same time as irradiating the second portion.

Embodiment 24 is the method of any of embodiments 1 to 23, wherein the first adhesive is a pressure sensitive adhesive (PSA), a structural adhesive, a structural hybrid adhesive, a hot melt adhesive, or a combination thereof.

Embodiment 25 is the method of any of embodiments 1 to 24, wherein the actinic radiation-polymerizable adhesive precursor composition comprises an acrylate, a two-part acrylate and epoxy system, a two-part acrylate and urethane system, or a combination thereof.

Embodiment 26 is the method of any of embodiments 1 to 25, wherein the actinic radiation-polymerizable adhesive precursor composition comprises an acrylate.

Embodiment 27 is the method of any of embodiments 1 to 26, wherein the photoinitiator is selected from 1-hydroxy cyclohexyl phenyl ketone, 2,2-dimethoxy-1,2-diphenylethan-1-one, bis(2,4,6-trimethylbenzoyl)phenylphosphineoxide, 1-[4-(2-hydroxyethoxy)phenyl]-2-hydroxy-2-methyl-1-propane-1-one, 2-benzyl-2-dimethylamino-1-(4-morpholinophenyl)butanone, 2-methyl-1-[4-(methylthio)phenyl]-2-morpholinopropan-1-one, and 2-hydroxy-2-methyl-1-phenyl propan-1-one.

Embodiment 28 is the method of any of embodiments 1 to 27, wherein the actinic radiation is provided by a digital light projector (DLP) with a light emitting diode (LED), a DLP with a lamp, a laser scanning device with a laser, a liquid crystal display (LCD) panel with a backlight, a photomask with a lamp, or a photomask with an LED.

Embodiment 29 is the method of embodiment 28, wherein the lamp is selected from a flash lamp, a low pressure mercury lamp, a medium pressure mercury lamp, and a microwave driven lamp.

Embodiment 30 is the method of any of embodiments 1 to 29, wherein the first adhesive adheres two materials together.

Embodiment 31 is the method of any of embodiments 1 to 30, wherein the first adhesive comprises variations in index of refraction.

Embodiment 32 is the method of any of embodiments 1 to 31, wherein the substrate comprises a multilayer construction.

Embodiment 33 is the method of embodiment 32, wherein the multilayer construction includes a polymeric sheet, an adhesive layer, and a liner.

Embodiment 34 is the method of embodiment 32 or embodiment 33, wherein the multilayer construction includes a coating upon which the first adhesive is disposed.

Embodiment 35 is the method of any of embodiments 1 to embodiment 34, wherein the actinic radiation-polymerizable adhesive precursor composition is a 100% polymerizable precursor composition.

Embodiment 36 is the method of any of embodiments 1 to 35, wherein the actinic radiation-polymerizable adhesive precursor composition includes at least one solvent.

Embodiment 37 is the method of embodiment 15, wherein the release material comprises silicone.

Embodiment 38 the method of any of embodiments 1 to 37, wherein the method is performed at a temperature between 20 degrees Celsius and 150 degrees Celsius, inclusive.

Embodiment 39 is a method of manufacturing adhesives. The method includes obtaining an actinic radiation-polymerizable adhesive precursor composition disposed on a major surface of an actinic radiation-transparent substrate and irradiating a first portion of the actinic radiation-polymerizable adhesive precursor composition through the actinic radiation-transparent substrate for a first irradiation dosage. The method further includes irradiating a second portion of the actinic radiation-polymerizable adhesive precursor composition through the actinic radiation-transparent substrate for a second irradiation dosage and moving the actinic radiation-transparent substrate. The first portion and the second portion are adjacent to or overlapping with each other and the first irradiation dosage and the second irradiation dosage are not the same, thereby forming an integral adhesive comprising a variable thickness in an axis normal to the actinic radiation-transparent substrate.

Embodiment 40 is the method of embodiment 39, further including irradiating a third portion of the actinic radiation-polymerizable adhesive precursor composition through the actinic radiation-transparent substrate for a third irradiation dosage, after moving the substrate.

Embodiment 41 is the method of embodiment 40, wherein the first irradiation dosage and the third irradiation dosage are the same.

Embodiment 42 is the method of embodiment 40 or embodiment 41, further including irradiating a fourth portion of the actinic radiation-polymerizable adhesive precursor composition through the actinic radiation-transparent substrate for a fourth irradiation dosage. The third portion and the fourth portion are adjacent to or overlapping with each other and the third irradiation dosage and the fourth irradiation dosage are not the same.

Embodiment 43 is the method of embodiment 42, further including moving the actinic radiation-transparent substrate after irradiating the fourth portion of the actinic radiation-polymerizable adhesive precursor composition through the actinic radiation-transparent substrate.

Embodiment 44 is the method of any of embodiments 39 to 43, further including post-curing the integral adhesive.

Embodiment 45 is the method of embodiment 44, wherein the post-curing includes using actinic radiation or heat.

Embodiment 46 is the method of any of embodiments 39 to 45, further including removing actinic radiation-polymerizable adhesive precursor composition from remaining in contact with the integral adhesive after the irradiating using a gas, a vacuum, a fluid, or a combination thereof.

Embodiment 47 is the method of any of embodiments 39 to 46, further comprising removing the integral adhesive from the substrate.

Embodiment 48 is the method of embodiment 47, wherein the integral adhesive is removed with a second substrate.

Embodiment 49 is the method of embodiment 48, wherein the second substrate includes a structured sheet.

Embodiment 50 is the method of embodiment 47, including removing the integral adhesive from the substrate with a robot.

Embodiment 51 is the method of any of embodiments 47 to 50, further including cleaning the substrate.

Embodiment 52 is the method of any of embodiments 39 to 51, wherein the substrate is coated with a release material.

Embodiment 53 is the method of any of embodiments 39 to 52, wherein the substrate includes glass or a polymeric material.

Embodiment 54 is the method of any of embodiments 39 to 53, wherein the substrate is in the form of a cylinder.

Embodiment 55 is the method of embodiment 54, including rotating the cylinder through a container holding the actinic radiation-polymerizable adhesive precursor composition to dispose the actinic radiation-polymerizable adhesive precursor composition on the substrate.

Embodiment 56 is the method of any of embodiments 39 to 53, wherein the precursor composition is disposed as a pool on the major surface of the substrate.

Embodiment 57 is the method of any of embodiments 39 to 56, wherein the time of irradiation of the first dosage is shorter than the time of irradiation of the second dosage.

Embodiment 58 is the method of any of embodiments 39 to 57, wherein the actinic radiation intensity of the first dosage is lower than the actinic radiation intensity of the second dosage.

Embodiment 59 is the method of any of embodiments 39 to 58, wherein irradiating the first portion occurs before irradiating the second portion.

Embodiment 60 is the method of any of embodiments 39 to 59, wherein irradiating the first portion occurs at the same time as irradiating the second portion.

Embodiment 61 is the method of any of embodiments 39 to 60, wherein the integral adhesive is a pressure sensitive adhesive (PSA), a structural adhesive, a structural hybrid adhesive, a hot melt adhesive, or a combination thereof.

Embodiment 62 is the method of any of embodiments 39 to 61, wherein the actinic radiation-polymerizable adhesive precursor composition comprises an acrylate, a two-part acrylate and epoxy system, a two-part acrylate and urethane system, or a combination thereof.

Embodiment 63 is the method of any of embodiments 39 to 62, wherein the actinic radiation-polymerizable adhesive precursor composition comprises an acrylate.

Embodiment 64 is the method of any of embodiments 39 to 63, wherein the photoinitiator is selected from 1-hydroxy cyclohexyl phenyl ketone, 2,2-dimethoxy-1,2-diphenylethan-1-one, bis(2,4,6-trimethylbenzoyl)phenylphosphineoxide, 1-[4-(2-hydroxyethoxy)phenyl]-2-hydroxy-2-methyl-1-propane-1-one, 2-benzyl-2-dimethylamino-1-(4- morpholinophenyl)butanone, 2-methyl-1-[4-(methylthio) phenyl]-2-morpholinopropan-1-one, and 2-hydroxy-2-methyl-1-phenyl propan-1-one.

Embodiment 65 is the method of any of embodiments 39 to 64, wherein the actinic radiation is provided by a digital light projector (DLP) with a light emitting diode (LED), a DLP with a lamp, a laser scanning device with a laser, a liquid crystal display (LCD) panel with a backlight, a photomask with a lamp, or a photomask with an LED.

Embodiment 66 is the method of embodiment 65, wherein the lamp is selected from a flash lamp, a low pressure mercury lamp, a medium pressure mercury lamp, and a microwave driven lamp.

Embodiment 67 is the method of any of embodiments 39 to 66, wherein the integral adhesive adheres two materials together.

Embodiment 68 is the method of any of embodiments 39 to 67, wherein the integral adhesive comprises variations in index of refraction.

Embodiment 69 is the method of any of embodiments 39 to 68, wherein the substrate comprises a multilayer construction.

Embodiment 70 is the method of embodiment 69, wherein the multilayer construction comprises a polymeric sheet, an adhesive layer, and a liner.

Embodiment 71 is the method of embodiment 69 or embodiment 70, wherein the multilayer construction includes a coating upon which the integral adhesive is disposed.

Embodiment 72 is the method of any of embodiments 39 to embodiment 71, wherein the actinic radiation-polymerizable adhesive precursor composition is a 100% polymerizable precursor composition.

Embodiment 73 is the method of any of embodiments 39 to 72, wherein the actinic radiation-polymerizable adhesive precursor composition includes at least one solvent.

Embodiment 74 is the method of embodiment 73, wherein the release material comprises silicone.

Embodiment 75 the method of any of embodiments 39 to 74, wherein the method is performed at a temperature between 20 degrees Celsius and 150 degrees Celsius, inclusive.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight. Table 1 provides a role and a source for materials used in the Examples below:

TABLE 1

| Materials | | | |
|---|---|---|---|
| Function | Abbreviation | Description | Source |
| Monomer 1 | iOA | IsoOctyl Acrylate | 3M, St Paul, MN |
| Monomer 2 | AA | Acrylic Acid | Sigma-Aldrich, St Louis, MO |
| Monomer 3 | iBOA | IsoBornyl Acrylate | OSAKA Organic Chemical Industry LTD, Osaka, Japan |
| Crosslinker1 | HDDA | 1,6-Hexanediol-diacrylate | Sartomer Americas, Exton, PA |
| Initiator 1 | IRGACURE TPO | 2,4,6-trimethylbenzoyl-diphenylphos-phine oxide | BASF Corporation, Florham Park, NJ |
| Inhibitor | BHT | 2,6 Di-tert-butyl-4-methyl-phenol | Sigma-Aldrich, St Louis, MO |
| Absorption Modifier | TINOPAL OB CO | Benzoxazole, 2,2'-(2,5-thiophenediyl)bis[5-(1,1-dimethylethyl)] | BASF Corporation, Florham Park, NJ |

Experimental Apparatus

An apparatus for the continuous additive manufacturing of adhesives was constructed as generally depicted in FIG. 1. The actinic radiation transparent substrate 10 was constructed from an Optically Clear Cast Acrylic Tube, 8 inches (20.32 centimeters (cm)) outer diameter×7¾ inches (19.7 cm) inner diameter, cut to a length of 6 inches (15.24 cm), obtained as item 8486K735 from McMaster-Carr, Chicago, Ill., which was wrapped with a clear PET silicone release liner, type RF12N in 5 mil (127 micrometer) thickness, available from SKC Haas, Seoul, Korea. Thus the siliconized side of the release liner formed the major surface 11 of the actinic radiation transparent substrate 10.

Side walls made from flat cast acrylic sheet with a 2 inch (5.08 cm) center hole and smaller access holes were inserted into the Clear Cast Acrylic Tube. Bearings with an outer diameter of 2 inches and an inner diameter of 1 inch were inserted into the 2 inch (5.08 cm) holes, allowing The Clear Cast Acrylic Tube to rotate around a 1 inch (2.54 cm) diameter, stationary, hollow steel tube. The steel tube was attached to a frame constructed from extruded aluminum. A drive system was constructed from a 3D printed cogwheel that was attached to the acrylic side wall, and a matching cogwheel on a 12V DC gear motor, model ZGA25RP83i manufactured by Wenzhou Zhengke Electromotor Co., Ltd, Yueqing, China, which was mounted to the extruded aluminum frame.

A 10 mm hole was drilled at the center of the steel tube, and 2 LEDs (One LED emitting 390 nm UV light, model UV3TZ-390-15, and one LED emitting 405 nm UV light, model UV3TZ-405-15, both available from Bivar Inc, Irvine, Calif.) with 40 cm cable leads and a 82 ohm resistor were inserted through the hole and mounted to the stationary hollow steel tube with help of small acrylic bars. The LEDs were facing downwards inside of the Clear Cast Acrylic Tube, with about 5 mm distance from the inner surface of the tube.

The DC Motor and the 2 LEDs were connected to an Arduino R3 microcontroller with Arduino Motor Shield, available from SparkFun Electronics, Niwot, Colo. The microcontroller was programmed to rotate the Clear Cast Acrylic Tube approximately 30 degrees, then to stop and light up the LEDs for 2 seconds, the program was set to repeat this sequence for a total of 10 times.

A container 16 with the base plate dimension of 6.5 inches (16.51 cm) by 4.5 inches (11.43 cm) and 0.5 inch (1.27 cm)

tall side walls was constructed from Optically Fluorescent Cast Acrylic, 3/32" Thick, Amber, available as 85635K471 from McMaster-Carr, Chicago, Ill., and placed on a lab jack under the Clear Cast Acrylic Tube.

A "Super Efficient Compressed-Air Air Knife, Aluminum, 6" Air Slot Width", available as item 6069K12 from McMaster-Carr, Chicago, Ill., was fitted to the frame, so that during the rotation of the drum it blows excess composition material from the major surface 11 back into the container 16.

A UV Intensity Analyzer, Model 356, from OAI Instruments, San Jose, Calif., was used to measure the intensity and energy of the LEDs at the major surface 11. The 400 nm broad band sensor was attached to the Analyzer, and the sensor surface was centered under the LED, with the sensor housing touching the major surface 11. For the 390 nm LED an intensity of 39.3 mW/cm$^2$ and an energy dosage of 79.1 mJ/cm$^2$ was measured for the 2 second illumination. For the 405 nm LED an intensity of 31.3 mW/cm$^2$ and an energy dosage of 63.7 mJ/cm$^2$ was measured for the 2 second illumination.

Example 1

An actinic radiation polymerizable composition was prepared by charging a 100 ml amber glass jar with 6.25 g AA, 21.9 g iOA and 21.9 g iBOA, 0.156 g HDDA, 0.05 g TINOPAL OB CO, 0.05 g BHT and 0.75 g IRGACURE TPO. The jar was sealed and rotated on a laboratory bench top roller MX-T6-S at approximately 10 RPM for 2 hours.

The composition was poured into the container 16 of the experimental apparatus and the container was lifted with help of the lab jack, so that the composition contacted the major surface 11 right underneath the LEDs.

The experimental apparatus was switched on and went through the sequence of rotating the drum and switching on the LEDs.

It was observed that at the spots that were illuminated by the LEDs dots of cured adhesive composition were formed. As the drum rotated, these dots emerged from the liquid composition and the excess liquid composition ran off the major surface 11, back into the container 16. The dots were approximately 3 mm in diameter and 0.5 mm in thickness.

A microscopy glass slide was pressed onto the dots, and it was observed that they adhered to the glass slide. The dots then were post cured for 10 minutes in an Asiga Flash UV post cure chamber, available from Asiga, Anaheim Hills, Calif., USA. This post cure chamber contains four 9 W fluorescent bulbs with a peak wavelength of 365 nm, arranged approximately 2 inches (5.08 cm) from a 5.5 inch (13.97 cm) by 5.75 inch (14.61 cm) base plate. The UV intensity was measured using the UV Intensity Analyzer, Model 356, from OAI Instruments, San Jose, Calif., with the 400 nm broad band sensor. A UV intensity of approximately 5.3 mW/cm$^2$ was found throughout the base plate.

After the post cure the dots were touched, and they felt sticky and adhered to the finger like a pressure sensitive adhesive. A piece of paper was pressed on the dots and it was observed that the paper and the glass slide were adhered together.

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A method of manufacturing adhesives comprising:
   obtaining an actinic radiation-polymerizable adhesive precursor composition disposed on a major surface of an actinic radiation-transparent substrate;
   irradiating a first portion of the actinic radiation-polymerizable adhesive precursor composition through the actinic radiation-transparent substrate for a first irradiation dosage to form a first adhesive;
   moving the actinic radiation-transparent substrate; and
   irradiating a second portion of the actinic radiation-polymerizable adhesive precursor composition through the actinic radiation-transparent substrate for a second irradiation dosage to form a second adhesive,
   wherein the first adhesive and the second adhesive are individual adhesives separated from each other by approximately the distance the actinic radiation-transparent substrate was moved.

2. The method of claim 1, further comprising irradiating a third portion of the actinic radiation-polymerizable adhesive precursor composition through the actinic radiation-transparent substrate to form a third adhesive prior to moving the substrate.

3. The method of claim 2, wherein the first portion and the third portion are adjacent to or overlapping with each other and the first irradiation dosage and the third irradiation dosage are not the same, thereby forming an integral adhesive comprising the first adhesive and the third adhesive, the integral adhesive comprising a variable thickness in an axis normal to the actinic radiation-transparent substrate.

4. The method of claim 3, wherein the integral adhesive comprises variations in index of refraction.

5. The method of claim 1, further comprising post-curing the first adhesive.

6. The method of claim 5, further comprising removing actinic radiation-polymerizable adhesive precursor composition remaining in contact with the first adhesive after the irradiating using a gas, a vacuum, a fluid, or a combination thereof.

7. The method of claim 1, further comprising removing the first adhesive from the substrate.

8. The method of claim 1, wherein the substrate is in the form of a cylinder, and the method further comprises rotating the cylinder through a container holding the actinic radiation-polymerizable adhesive precursor composition to dispose the actinic radiation-polymerizable adhesive precursor composition on the substrate.

9. The method of claim 1, wherein the precursor composition is disposed as a pool on the major surface of the substrate.

10. The method of claim 1, wherein the time of irradiation of the first dosage is shorter than the time of irradiation of the second dosage.

11. The method of claim 1, wherein the actinic radiation intensity of the first dosage is lower than the actinic radiation intensity of the second dosage.

12. The method of claim 1, wherein irradiating the first portion occurs before irradiating the second portion.

13. The method of claim 1, wherein the first adhesive is a pressure sensitive adhesive (PSA), a structural adhesive, a structural hybrid adhesive, a hot melt adhesive, or a combination thereof.

14. The method of claim 1, wherein the actinic radiation-polymerizable adhesive precursor composition comprises an acrylate, a two-part acrylate and epoxy system, a two-part acrylate and urethane system, or a combination thereof.

15. The method of claim 1, wherein the actinic radiation is provided by a digital light projector (DLP) with a light emitting diode (LED), a DLP with a lamp, a laser scanning device with a laser, a liquid crystal display (LCD) panel with a backlight, a photomask with a lamp, or a photomask with an LED.

16. The method of claim 1, wherein the substrate comprises a multilayer construction.

17. The method of claim 1, wherein the actinic radiation-polymerizable adhesive precursor composition includes at least one solvent.

18. The method of claim 1, wherein the method is performed at a temperature between 20 degrees Celsius and 150 degrees Celsius, inclusive.

19. A method of manufacturing adhesives comprising:
obtaining an actinic radiation-polymerizable adhesive precursor composition disposed on a major surface of an actinic radiation-transparent substrate;
irradiating a first portion of the actinic radiation-polymerizable adhesive precursor composition through the actinic radiation-transparent substrate for a first irradiation dosage;
irradiating a second portion of the actinic radiation-polymerizable adhesive precursor composition through the actinic radiation-transparent substrate for a second irradiation dosage, wherein the first portion and the second portion are adjacent to or overlapping with each other and the first irradiation dosage and the second irradiation dosage are not the same, thereby forming an integral adhesive comprising a variable thickness in an axis normal to the actinic radiation-transparent substrate; and
moving the actinic radiation-transparent substrate.

* * * * *